(12) United States Patent
Shimada et al.

(10) Patent No.: US 6,415,218 B2
(45) Date of Patent: Jul. 2, 2002

(54) CONTROL SYSTEM FOR AUTOMOTIVE VEHICLE

(75) Inventors: Kousaku Shimada, Hitachinaka; Satoru Kuragaki, Hitachi; Koji Matsufuji, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/793,423

(22) Filed: Feb. 27, 2001

(30) Foreign Application Priority Data

Feb. 29, 2000 (JP) .......................................... 2000-058027

(51) Int. Cl.[7] .............................................. F02D 41/00
(52) U.S. Cl. ........................ 701/103; 701/105; 701/115; 123/399
(58) Field of Search ................................ 701/101, 102, 701/103, 105, 115, 29, 35; 123/399, 480, 486, 361; 477/110

(56) References Cited

U.S. PATENT DOCUMENTS

| | | | | |
|---|---|---|---|---|
| 4,653,449 A | * | 3/1987 | Kamei et al. ................ | 123/478 |
| 5,660,157 A | * | 8/1997 | Minowa et al. .............. | 123/344 |
| 5,727,528 A | * | 3/1998 | Hori et al. ................... | 123/486 |
| 5,857,445 A | * | 1/1999 | Shimada et al. ............. | 123/478 |
| 5,979,404 A | * | 11/1999 | Minowa et al. .............. | 123/399 |
| 6,202,628 B1 | * | 3/2001 | Iwano et al. ................. | 123/361 |

FOREIGN PATENT DOCUMENTS

| | | | | |
|---|---|---|---|---|
| JP | 58-190530 A | * | 11/1983 | ........... F02D/33/00 |
| JP | 2611239 | | 1/1989 | |
| JP | 7-47862 | | 2/1995 | |
| JP | 10-299523 A | * | 11/1998 | ........... F02D/41/02 |

* cited by examiner

*Primary Examiner*—John Kwon
*Assistant Examiner*—Hieu T. Vo
(74) *Attorney, Agent, or Firm*—Crowell & Moring LLP

(57) ABSTRACT

A control system for an automotive vehicle is capable of realizing superior control precision and response ability by an intake air flow rate control on the basis of a fuel injection amount which is, in turn, derived on the basis of a target torque even in lean-burn condition. The control system controls at least one of vehicle speed, a vehicular distance, driving wheel speed, slip ratio toward a target value, derives a target torque of an engine on the basis of the target value, a fuel injection amount for the engine on the basis of the target torque of the engine, a target air supply amount to the engine on the basis of the fuel injection amount derived by the vehicle condition control means and an actual air supply amount of the engine. The control system controls the actual air supply amount toward the target air supply amount.

15 Claims, 28 Drawing Sheets

REFERENCE Tp2 TABLE

| ACCELERATOR DEPRESSION MAGNITUDE APS (deg) | ... | 4 | 8 | ... |
|---|---|---|---|---|
| REFERENCE Tp2 (ms) | ... | 2.31 | 2.52 | ... |

CONTROL SYSTEM FOR AUTOMOTIVE VEHICLE

BACKGROUND OF THE INVENTION

The present invention relates to an electronic engine control system for controlling an engine output torque by controlling an intake air flow rate by an electronically controlled throttle valve and controlling a fuel injection amount by a fuel injector.

Conventionally, transfer of a demanded torque of a traveling system to an engine control system and reflection of the demanded torque to engine control are performed in the following manner.

For example, Japanese Patent Application Laid-Open No. Heisei 7-47862 discloses an automatic cruise control, in which a throttle command is derived from a torque command in consideration that directly using a difference ($V_0 - V_a$) between a target vehicle speed $V_0$ and an own vehicle speed $V_a$ multiplied by a constant is not achieve satisfactorily high accuracy and response.

On the other hand, Japanese Patent No. 2611239 proposes a method for deriving a throttle valve open degree from the target torque, induction pressure and an engine revolution speed on the basis of a physical model with pointing out that when a linear control logic is applied for a control object, i.e. vehicle, in which linear relationship between a control input (throttle valve open degree) and a control output (vehicle speed) is not established, control rule has to be designed per each operational range, and in case of PID control for controlling a throttle valve open degree to open and close depending upon a difference between the target vehicle speed and the actual vehicle speed is not satisfactory in control precision and response ability.

The foregoing conventional systems is partially similar to the present invention in focusing the target torque and can expect superior control precision and response ability in comparison with PID control of speed difference.

However, while the foregoing prior arts propose to derive the throttle valve open degree from the throttle valve open degree, no consideration has been given for lean-burn. Therefore, it has not been considered a fact that the throttle valve open degree should be different at the same target torque between a combustion condition at stoichiometric air/fuel (A/F) mixture ratio and a combustion condition at lean mixture. For instance, A/F mixture ratio is 14.7 at stoichiometric condition and A/F mixture ratio is 40 at lean-burn condition. Therefore, there is 2.7 times of difference in air equivalent to require greater difference in the throttle valve open degree.

In addition, Japanese Patent Application Laid-Open No. Heisei 7-47862 does not discuss about a particular method for establishing relationship between the torque and the throttle valve open degree. Also. Japanese Patent No. 2611239 fails to disclose particular functions.

SUMMARY OF THE INVENTION

It is therefore an object of the present invention to provide a control system for an automotive vehicle which can realize superior control precision and response ability by an intake air flow rate control on the basis of a fuel injection amount which is, in turn, derived on the basis of a target torque or a target load signal even in lean-burn condition.

In order to accomplish the above-mentioned and other objects and in accordance with the first aspect of the invention, a control system for an automotive vehicle comprises: control means for controlling at least one of vehicle speed, a vehicular distance, driving wheel speed, slip ratio toward a target value; means for deriving a target torque of an engine on the basis of the target value; vehicle condition control means having means for deriving a fuel injection amount for the engine on the basis of the target torque of the engine; means for deriving a target air supply amount to the engine on the basis of the fuel injection amount derived by the vehicle condition control means; means for deriving an actual air supply amount of the engine; and means for controlling the detected actual air supply amount toward the target air supply amount.

In the alternative, in accordance with the second aspect of the present invention, a control system for an automotive vehicle comprises control means for controlling at least one of vehicle speed, a vehicular distance, driving wheel speed, slip ratio toward a target value; means for deriving a target torque of an engine on the basis of the target value; vehicle condition control means having means for converting the target torque of the engine to a reference fuel injection amount (Tp2); means for deriving an air amount corresponding to a target fuel injection amount (Tp3) of the engine derived on the basis of a target air/fuel ratio determined depending upon the reference fuel injection amount (TP2) and operating condition of the vehicle; means for deriving an air amount corresponding the basic fuel injection amount Tp1 of the engine at the stoichiometric air/fuel ration (A/F=14.7) on the basis of an intake air flow rate of the engine and an engine revolution speed; and means for controlling a throttle valve open degree for controlling the air amount corresponding to the basic fuel injection amount (Tp1) toward the air amount corresponding to the target fuel injection amount (Tp3).

In the preferred construction, converting means for converting the target torque into the reference fuel injection amount (Tp2) of the engine performs conversion with one of a function, a table and a map indicative of the target torque and the reference fuel injection amount (Tp2).

The control system may further comprise means for deriving the reference fuel injection amount (Tp2) on the basis of a torque corresponding to an acceleration depression magnitude in addition to the means for deriving the reference duel injection amount (Tp2) derived by conversion from the target torque, and reference fuel injection amount selecting means for selecting one of the reference fuel injection amount (Tp2) depending upon operational demand of a driver. In such case, the means for deriving the reference fuel injection amount (Tp2 on the basis of the torque corresponding to the accelerator depression magnitude includes means for converting the reference fuel injection amount (Tp2) based on the accelerator depression magnitude into the torque using an inverse function of converting means for converting from the target torque into the reference fuel injection amount (Tp2) and a reverse retrieval of the table or map.

The control may be performed using at least one of control parameters among air/fuel ratio, spark ignition timing, fuel injection start timing, fuel injection termination timing, EGR ratio, control parameter of swirl flow in an engine cylinder in addition to control of the throttle valve open degree upon controlling the air amount corresponding to the basic fuel injection amount (Tp1) to the air amount corresponding to the target fuel injection amount (Tp3). In such case, the control parameters may include three kinds for stoichiometric mixture combustion, homogenous lean combustion and stratified lean combustion depending upon operating condition of the engine.

The vehicle condition control means may include automatic cruise control means for controlling a traveling speed of the automotive vehicle constant, vehicular distance control means for controlling vehicular distance to a leading vehicle, traction control means for controlling driving wheel speed of the vehicle and side slip control means, and the control system further comprises means for transmitting the target torque from the vehicle condition control means to the engine control means. The first reference fuel injection amount (Tp2) converted from the target engine torque derived by the automatic cruise control means may be used during cruising under automatic cruise control and the second reference fuel injection amount (Tp2) derived at least on the basis of an accelerator depression magnitude under inoperative state of automatic cruise control, and even under automatic cruise control, the second reference fuel injection amount (Tp2) is retrieved on the basis of the accelerator depression magnitude on the basis of correspondence to conversion when a demanded torque of the driver is greater than the target engine torque. In the alternative, the first reference fuel injection amount (Tp2) converted from the target engine torque derived by the vehicular distance control means is used while vehicular distance control is active and the second reference fuel injection amount (Tp2) derived at least on the basis of an accelerator depression magnitude under inoperative state of vehicular distance control, and even under vehicular distance control, the second reference fuel injection amount (Tp2) is retrieved on the basis of the accelerator depression magnitude on the basis of correspondence to conversion when a brake is depressed or a demanded torque of the driver is greater than the target engine torque. In the further alternative, the first reference fuel injection amount (Tp2) converted from the target engine torque derived by the traction control means or side slip control means may be used while the traction control means or the side slip control means is active for controlling driving wheel speed or tire slip ratio and the second reference fuel injection amount (Tp2) derived at least on the basis of an accelerator depression magnitude under inoperative state of traction control or side slip control.

According to the third aspect, a control method for an automotive vehicle comprises the steps of: controlling a vehicular condition of at least one of vehicular speed, vehicular distance, driving wheel speed and slip ratio toward a target value; replacing the target value into a target torque of an engine; deriving a fuel injection amount of the engine on the basis of the target torque of the engine; deriving a target air supply amount on the basis of the fuel injection amount; deriving an actual air supply amount of the engine on the basis of detected vehicular condition; and controlling g the actual air supply amount thus derived toward the target air supply amount.

According to the fourth aspect of the invention, a control method for an automotive vehicle comprises the steps of: controlling at least one of vehicle speed, a vehicular distance, driving wheel speed, slip ratio toward a target value; deriving a target torque of an engine on the basis of the target value; converting the target torque of the engine to a reference fuel injection amount (Tp2); deriving an air amount corresponding to a target fuel injection amount (Tp3) of the engine derived on the basis of a target air/fuel ratio determined depending upon the reference fuel injection amount (TP2) and operating condition of the vehicle; deriving an air amount corresponding the basic fuel injection amount Tp1 of the engine at the stoichiometric air/fuel ration (A/F=14.7) on the basis of an intake air flow rate of the engine and an engine revolution speed; and controlling a throttle valve open degree for controlling the air amount corresponding to the basic fuel injection amount (Tp1) toward the air amount corresponding to the target fuel injection amount (Tp3).

According to the fifth aspect of the invention, a control system for an automotive vehicle comprises: vehicle condition control means for controlling a vehicular condition toward a target value, and obtaining a fuel injection amount for the engine according to a target load signal based on said target value; means for deriving a target air supply amount to said engine on the basis of said fuel injection amount derived by said vehicle condition control means, deriving an actual air supply amount of the engine; and controlling the detected actual air supply amount toward said target air supply amount.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific detailed. In the other instance, well known structure are not shown in detail in order to avoid unnecessary obscurity of the present invention.

The preferred embodiment of a cruise control system and an engine control system according to the present invention will be discussed hereinafter in detail with reference to the drawings.

Figure 5:
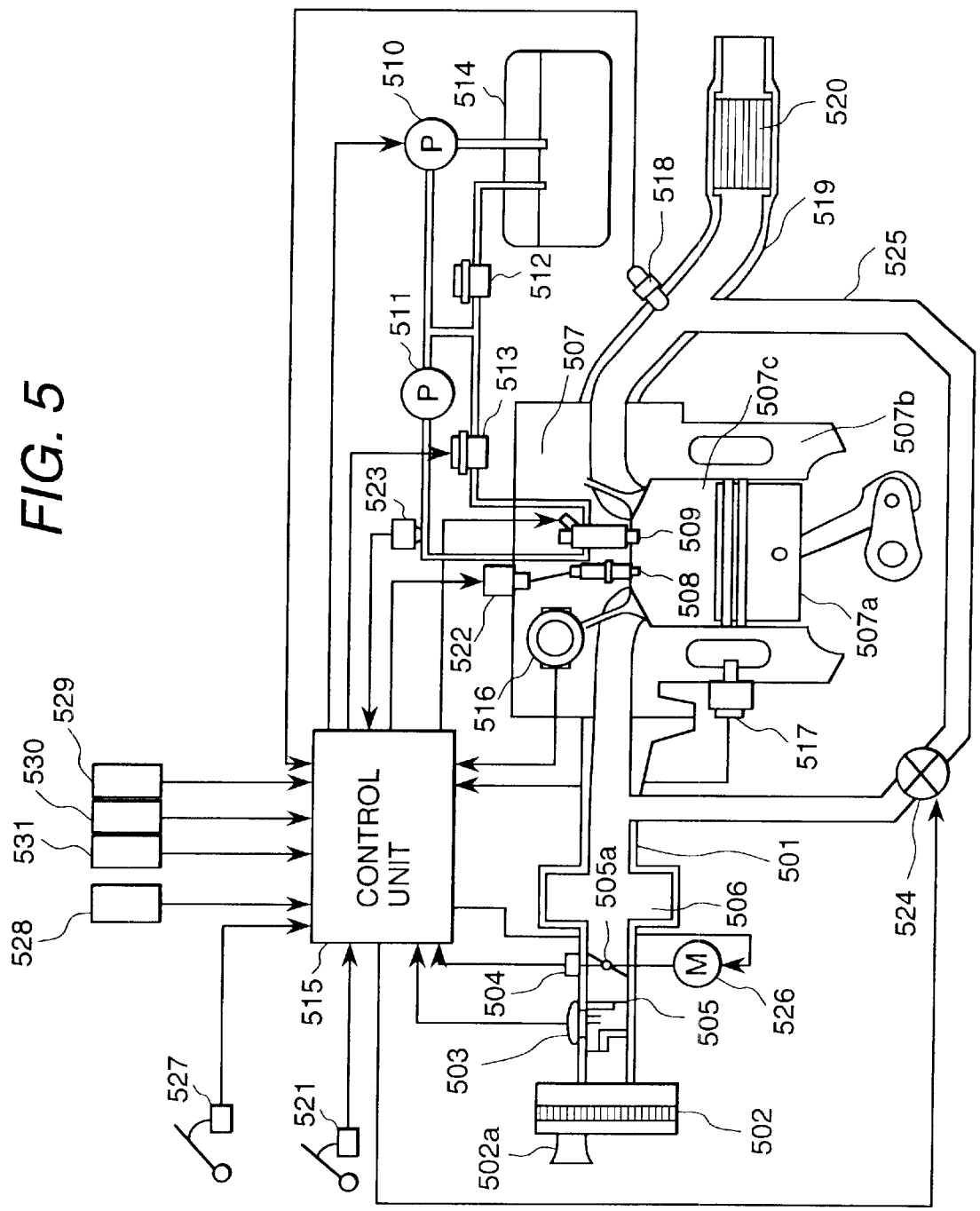
FIG. 5 is a diagrammatic illustration showing an overall construction of an engine system incorporating the preferred embodiment of an engine control system according to the present invention.

FIG. 5 shows an overall construction of the preferred embodiment of a control system of an engine 507. In FIG. 5, an air to be sucked into the engine 507 is introduced through an inlet portion 502a of an air cleaner, passes through an air flow sensor 503, also passes through a throttle body receiving a throttle valve 505 controlling an intake air flow rate, and flows into a collector 506.

The intake air introduced into the collector 506 is distributed into each induction pipe 501 connected to each engine cylinder 507b of the engine 507 and then introduced into each combustion chamber 507c of the engine cylinder 507b.

On the other hand, a fuel, such as gasoline, is sucked from a fuel tank 514 with the first stage pressurization by a fuel pump 510 and is subject to the second stage pressurization by a fuel pump 511. The fuel thus pressurized is supplied to a fuel system, in which fuel injectors 509 are interposed. The fuel pressurized by the first stage pressurization is regulated by a fuel pressure regulator 512 at a given constant pressure, e.g. 3 kg/cm$^2$. The fuel further pressurized by the second stage pressurization is regulated by a fuel pressure regulator 513, e.g. 30 Kg/cm$^2$. Then, the fuel at regulated pressure is injected into the combustion chamber 507c from the fuel injector 509 provided in each engine cylinder 507b. The fuel thus injected into the combustion chamber is burned by an ignition plug 508 in response to an ignition signal of elevated voltage by an ignition coil 522.

On the other hand, from the air flow sensor 503, a signal indicative of an intake air flow rate is output and input to a control unit 515.

Furthermore, the throttle sensor 504 for detecting open degree of the throttle valve 505a is mounted on the throttle body 505, and an output thereof is also input to the control unit 515.

Next, the reference numeral 516 denotes a crank angle sensor mounted on a crank shaft (not shown) outputting a crank reference signal REF and a crank angle signal POS respectively indicative of angular position of the crank shaft, which crank angle signal is to be used for deriving an engine revolution speed. These signals are also input to the control unit 515.

An air/fuel ratio sensor (A/F sensor) 518 provided upstream aide of a catalytic converter 520 in an exhaust pipe 519 detects an exhaust gas (typically oxygen concentration in the exhaust gas) for outputting a detection signal (A/F signal) for inputting to the control unit 515.

The major portion of the control unit 515 is constructed with MPU 603, ROM 602, RAM 604, an I/O LSI including an A/D converter, and the like, for receiving signals from various sensors detecting engine operating condition, executing predetermined arithmetic operation for outputting various control signals resulting from the arithmetic operation. Amongst, predetermined control signals are supplied to the fuel injector 509 and the ignition coil 522 to execute a fuel supply amount control and an ignition timing control.

Figure 3:
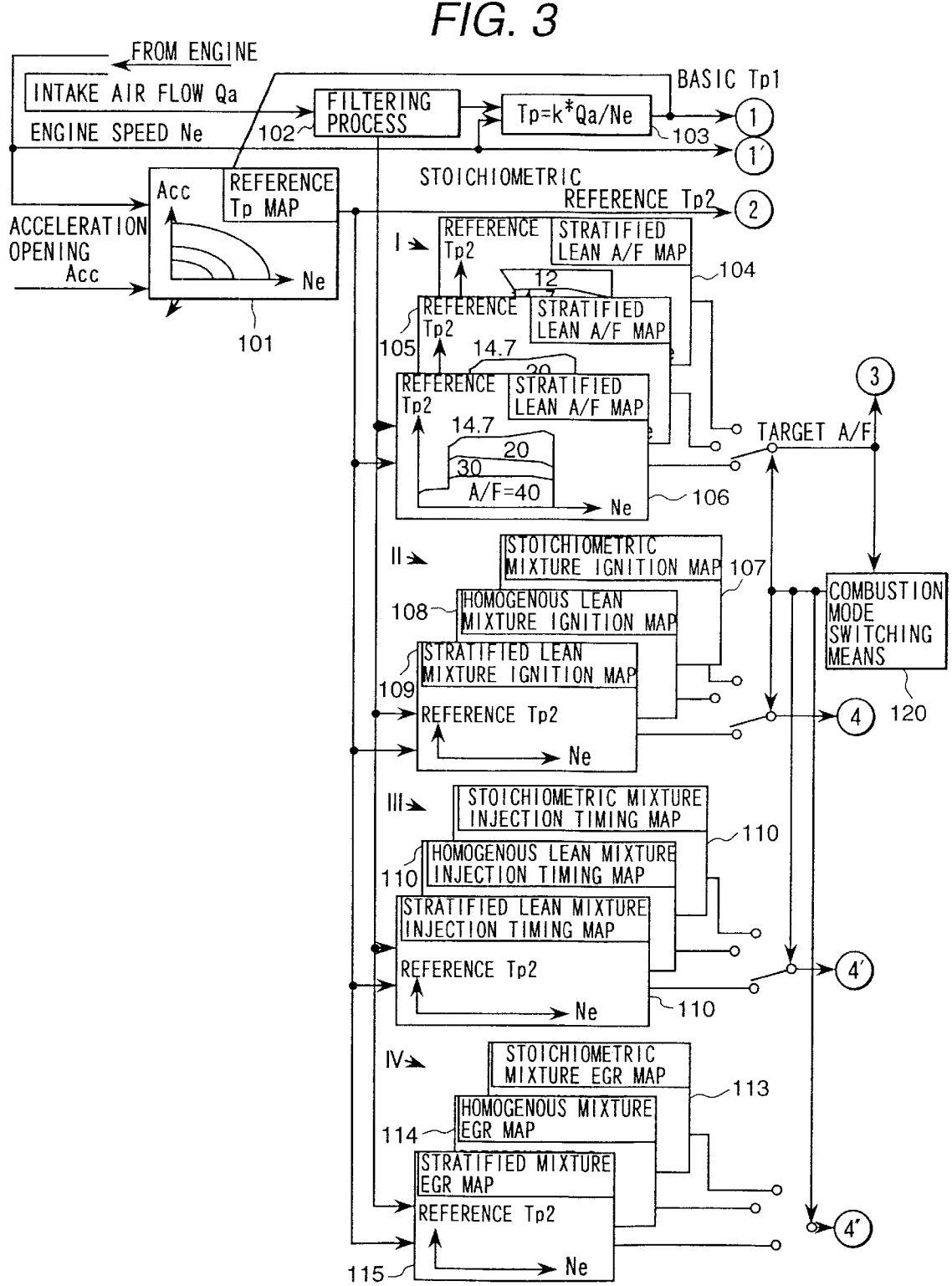
FIG. 3 is a block diagram of a leading stage of the preferred embodiment of an engine control system illustrated in FIG. 5.
Figure 4:
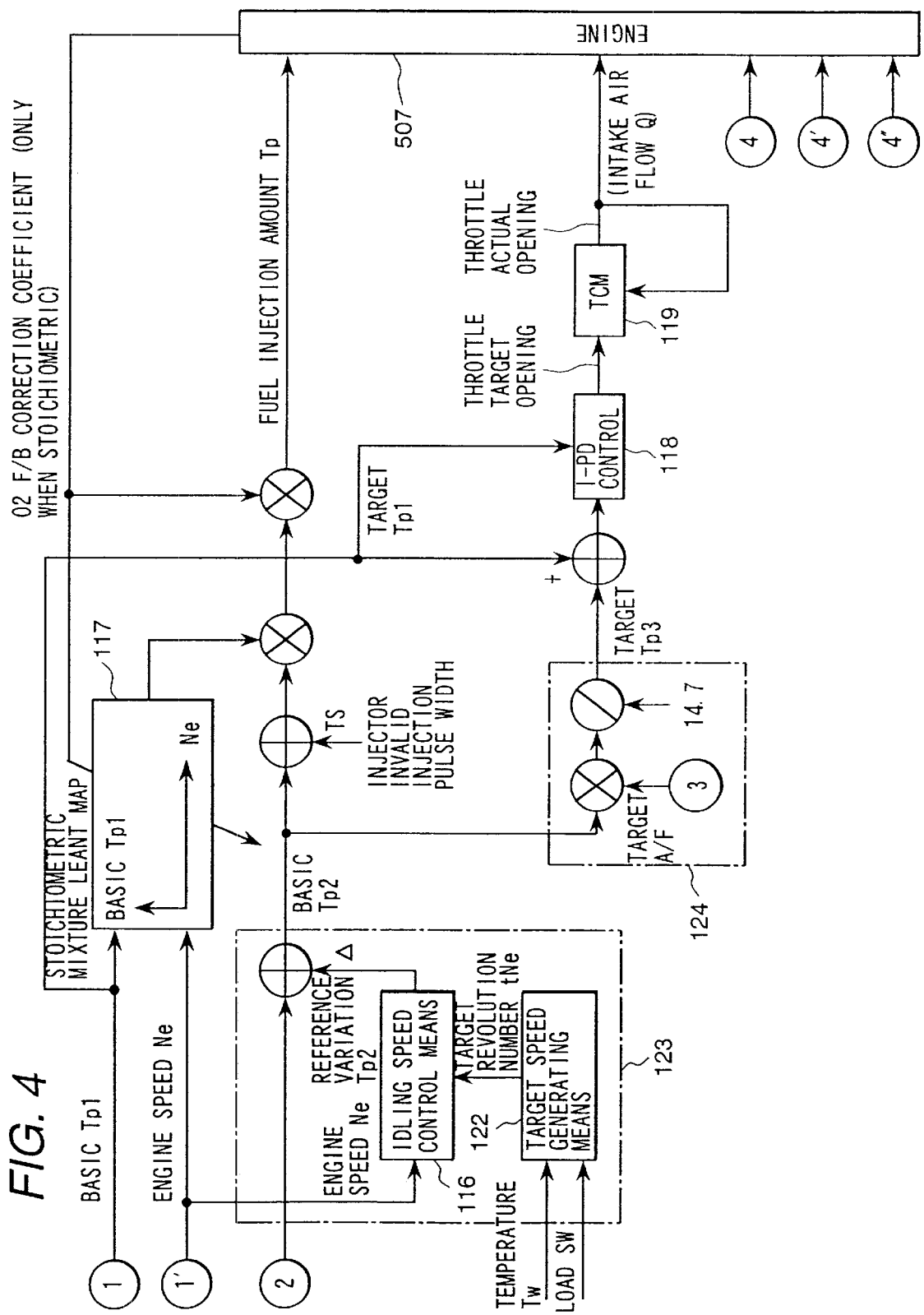
FIG. 4 is a block diagram of a following stage of the preferred embodiment of an engine control system illustrated in FIG. 5.

FIGS. 3 and 4 generally show overall control to be executed by the control unit 515 in cylinder injection type internal combustion engine constructed as set forth above. The systems shown in FIGS. 3 and 4 are composed into one control system.

An intake air flow rate Qa detected by the air flow sensor 503 of FIG. 5 is subject to a filtering process by filtering process means 102 of FIG. 3. The intake air flow rate Qa us divided by an engine revolution speed Ne and multiplied by a coefficient k to establish a stoichiometric air/fuel ratio (A/F=14.7) for deriving a reference fuel injection pulse width per one cylinder, namely a basic fuel injection amount Tp1. Furthermore, the basic fuel injection amount Tp1 is corrected for correcting deviation in characteristics possibly caused due to individual difference of characteristics of the air flow sensor 503 and the fuel injector 509 or secular change by reference fuel injection amount correcting means 117 of FIG. 4. Correction is performed by multiplying the reference fuel injection amount by a correction coefficient which derived by learnt at respective operation point determined by the basic fuel injection amount Tp1 and the engine revolution speed Ne only when the air/fuel ratio is stoichiometric value.

On the other hand, in reference fuel injection amount determining means 101 of FIG. 3, a reference fuel injection amount Tp2 to be a reference of a target fuel injection amount Tp3 is derived by way of map look-up on the basis of the engine revolution speed Ne and an accelerator depression magnitude Acc in the same dimension.

Values on the map to be looked up for deriving the reference fuel injection amount Tp2 is preliminarily set to establish a relationship between the basic fuel injection amount Tp1 and the reference fuel injection amount Tp2 so that the basic reference fuel injection amount Tp2 becomes equal to the basic fuel injection amount Tp1 when the engine is driven at stoichiometric air/fuel ratio. Here, it should be noted that the map for deriving the reference fuel injection amount Tp2 is rewritable so as to enabling leaning of the reference fuel injection amount Tp2 on the basis of the basic fuel injection amount Tp1 adapting for fluctuation of sensors or the like in actual vehicle.

In the shown embodiment, maps of the air/fuel ratio, the ignition timing, the fuel injection timing, an EGR ratio and so forth as control parameter of the engine are adapted to be retrieved with taking two parameters of the engine revolution speed Ne and the reference fuel injection amount Tp2. Since the reference fuel injection amount Tp2 is expressed as a function of an engine load, the parameter of the reference fuel injection amount Tp2 may be replaced with the load on the engine. Also, the parameter of the reference fuel injection amount Tp2 can be replaced with the accelerator depression amount Acc. On the other hand, as set forth above, at the stoichiometric air/fuel ratio, the reference fuel injection amount Tp2 matches with the basic fuel injection amount Tp1. On the other hand, the three maps for stoichiometric mixture combustion, homogeneous lean combustion and stratified lean combustion are provided.

The air/fuel ratio map (I) of FIG. 3 is consisted of three maps of a map 104 for stoichiometric mixture, a map 105 for homogeneous lean mixture and a map 106 for stratified lean mixture, an ignition timing map (II) is consisted of three maps of a map 107 for stoichiometric mixture, a map 108 for homogeneous lean mixture and a map 109 for stratified lean mixture, a fuel injection timing map (III) is consisted of three maps of a map 110 for stoichiometric mixture, a map 111 for homogeneous lean mixture and a map 112 for stratified lean mixture, and an EGR ratio map (IV) is consisted of three maps of a map 113 for stoichiometric mixture, a map 114 for homogeneous lean mixture and a map 115 for stratified lean mixture.

Maps to be used in each parameter of the air/furl ratio, the ignition timing, the fuel injection timing and EGR ratio is determined by combustion mode switching means 120 of FIG. 3. Detail of the process in the combustion mode switching means 120 will be discussed later with reference to FIG. 8.

The intake air flow rate Qa and the fuel injection amount Tp as two factors for determining the air/fuel ratio of the engine are both derived on the basis of the reference fuel injection amount Tp2. The fuel injection amount Tp is derived by adding a reference variation amount $\Delta Tp2$ to the reference fuel injection amount Tp2 to derive the reference fuel injection amount Tp2', further adding the null injection pulse width Ts of the injector and then multiplying a $O_2$ feedback correction coefficient only in stoichiometric mixture mode operation.

On the other hand, the intake air flow rate Qa is derived by multiplying the reference fuel injection amount Tp2' derived by adding the reference variation amount $\Delta Tp2$ to the reference fuel injection amount Tp2, by a target air/fuel ratio (e.g. 40) in target fuel injection amount Tp3 calculating means 124, and then dividing the product by a stoichiometric air/fuel ratio 14.7 to derive the target fuel injection amount Tp3 for achieving the target air/fuel ratio. It should be noted that the target fuel injection amount Tp3 is not used as a target value of the fuel injection amount but as a target value of the intake air flow rate for control. By feedback controlling the throttle valve open angle by comparing the target fuel injection amount Tp3 and the basic fuel injection amount Tp1, the basic fuel injection amount Tp1 can follow the target fuel injection amount Tp3 to control the intake air flow rate to adapt to the desired air/fuel ratio.

Throttle control means 118 of FIG. 4 compares the air amount corresponding to the target fuel injection amount Tp3 and the air amount corresponding to the basic fuel injection amount Tp1 and determines the target throttle valve open degree on the basis of the difference therebetween. A TCM (throttle control module 119 controls the throttle valve open degree in response to a target open degree command.

Figure 1:
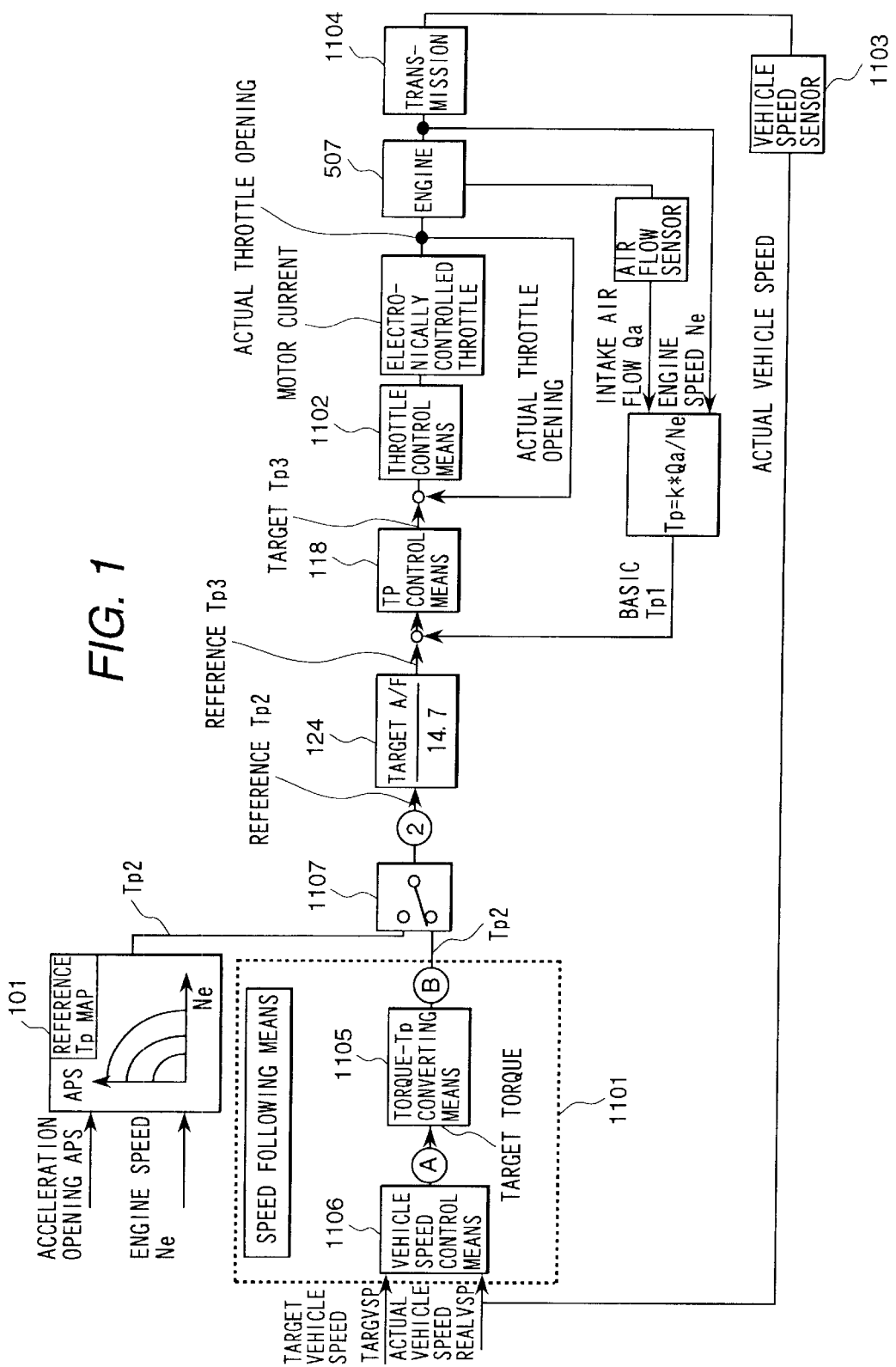
FIG. 1 is a block diagram showing one embodiment of a control system according to the present invention.
Figure 2:
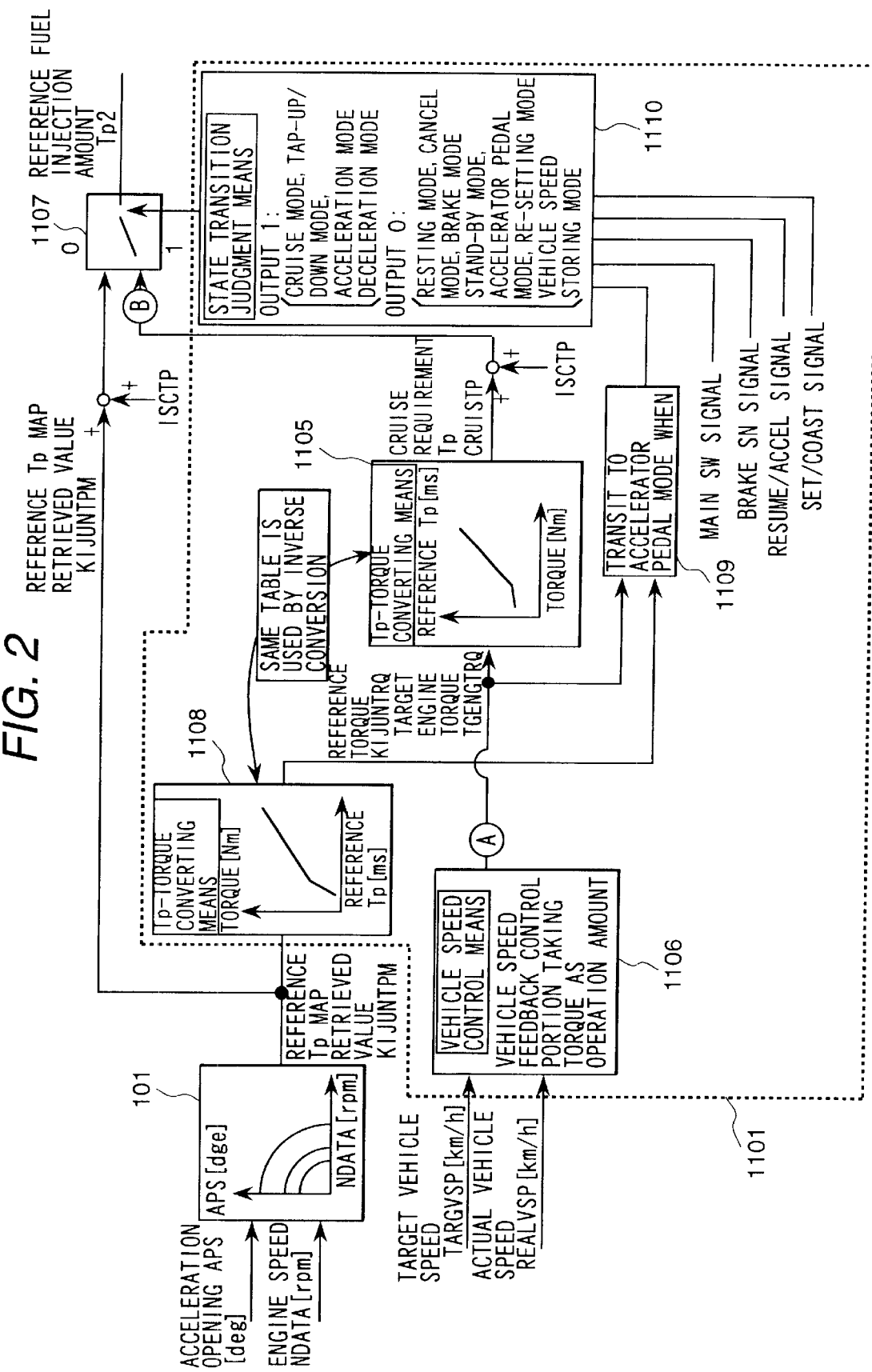
FIG. 2 is a block diagram showing a detail of speed follower means of one embodiment of the control system of the block diagram of FIG. 1.

Next, FIGS. 1 and 2 are block diagrams adapting conversion of the target torque into the reference fuel injection amount Tp2 and selection among two kinds of Tp2 calculated at two sites, to the basic system illustrated in FIGS. 3 and 4.

In FIGS. 1 and 2, outputting of the target engine torque will be discussed in terms of speed following means to be used in an automatic cruise control.

At first, a relationship between FIGS. 1, 3 and 4 is that ② of FIG. 1 corresponds to an output ② of reference fuel injection amount determining means 101 of FIGS. 3 and 4. Namely, while the reference fuel injection amount determining means 101 is only means for deriving the reference fuel injection amount in FIGS. 3 and 4, speed following means 1101 also derives the reference fuel injection amount in the embodiment of FIG. 1. Therefore, in the shown embodiment of FIG. 1, the reference fuel injection amounts derived by the reference fuel injection amount determining means 101 and the speed following means 1101 are selectively used.

Operation of respective elements in the embodiment of FIG. 1 will be discussed hereinafter.

In the reference fuel injection amount determining means 101, the reference fuel injection amount Tp2 is derived by map looking in terms of the engine revolution speed Ne and the accelerator depression amount APS, to be a reference of the target fuel injection amount Tp3, in the same condition as the basic fuel injection amount Tp1. The reference fuel injection amount Tp2 is derived with taking the accelerator depression magnitude indicative of operation magnitude by the driver and thus reflects an intention of the driver.

On the other hand, in the speed following means 1101, a target engine torque for adjusting a current vehicle speed REALVESP to a target vehicle speed TARGVSP, is calculated by vehicle speed control means 1106. Then, the target engine torque thus calculated is converted into the reference fuel injection amount Tp2 by torque-Tp converting means 1105. The reference injection amount Tp2 thus derived represents the fuel injection amount necessary for adjusting the vehicle speed toward the target vehicle speed.

Selection of the reference fuel injection amounts Tp2 derived by the reference fuel injection amount determining means 101 and the speed following means 1101 by the fuel injection amount selecting means 1107 will be discussed in detail. Blocks following to inputting of the reference fuel injection amount Tp2 at ② is equivalent to that illustrated in FIG. 4.

Next, FIG. 2 is a detailed block diagram of the speed following means of FIG. 1, and particularly illustrates operation for switching Tp2 representative of driver's intention and Tp2 necessary for vehicle speed control. Ⓐ and Ⓑ in FIG. 1 correspond to Ⓐ and Ⓑ in FIG. 2, in which Ⓐ is a target engine torque, and Ⓑ is the reference fuel injection amount Tp2 after conversion and in other words, a demanded fuel injection amount Tp for cruising (which will be hereinafter referred to as cruise-demanded fuel injection amount Tp).

For example, when a main switch of automatic cruise control is maintained OFF and the vehicle is driven by the driver depressing the accelerator, the reference fuel injection amount derived by adding an ISCTP for idling speed control (ISC) to KIJUNTPM retrieved by reference fuel injection amount determining means 101 in terms of the accelerator open degree and the engine revolution speed, is selected by the fuel injection amount selection means 1107 as the reference fuel injection amount Tp2.

On the other hand, during cruising under cruise control, the vehicle is driven to automatically without requiring depression of the accelerator by the driver. For this purpose, the vehicle speed control means 1106 derives a target engine torque TGENGTRQ. The target engine torque TGENGTRQ is converted into Tp2 by the torque-TP converting means 1105. The ISCTP for ISC is added to Tp2 thus derived for deriving the reference fuel injection amount Tp2 for cruise control, which will be hereinafter referred to as "cruise control reference fuel injection amount Tp2". The cruise control reference fuel injection amount Tp2 is selected by the duel injection amount selecting means 1107.

One of Tp2 to be selected by the fuel injection amount selecting means is determined by state transition judgment means 1110. Basically, Tp2 to be selected is determined depending upon mode in the automatic cruise control. State transition will be discussed with reference to the state transition chart in FIG. 9. At an occurrence of an acceleration demand by depression of an accelerator by the driver during cruising, if an accelerator depression magnitude is small, cruising state can be maintained. However, if depression amount of the accelerator is significant, higher preference is given for Tp2 reflecting the driver's intention which is represented by KIJUNTPM for distinction and will be referred hereinafter as "manual control reference fuel injection amount Tp2". Which Tp2 is selected is determined depending upon a traveling speed of the vehicle. For making judgment, reference fuel injection amount Tp2-torque converting means 1108 and torque comparing means 1109 are provided. The reference fuel injection amount Tp2-torque converting means 1108 performs back-conversion of the torque-Tp converting means 1105 and can be realized utilizing the common table by reverse retrieval in software. A reference torque KIJUNTRQ thus obtained represents a torque demanded by the driver. In the torque comparing means 1109, the target engine torque and the reference torque are compared to output the result to the state transition judgment means 1110. When the reference torque is greater than or equal to the target engine torque, the automatic cruise control transits an accelerator pedal mode to output zero (0) to the fuel injection amount selecting means for selecting a value derived from a reference fuel injection amount Tp map retrieved value KIJUNTPM as the reference fuel injection amount Tp2. In addition, the state transition judgment means 1110 outputs zero (0) to the fuel injection amount selecting means 1107 at operation stop mode, cancel mode, brake mode, stand-by mode, re-setting mode and a vehicle speed storing mode. Conversely, the state transition judgment means 1110 outputs 1 to make cruise demanded fuel injection amount Tp at cruise mode, tap-up mode, tap-down mode, acceleration mode and deceleration mode.

Figure 25:
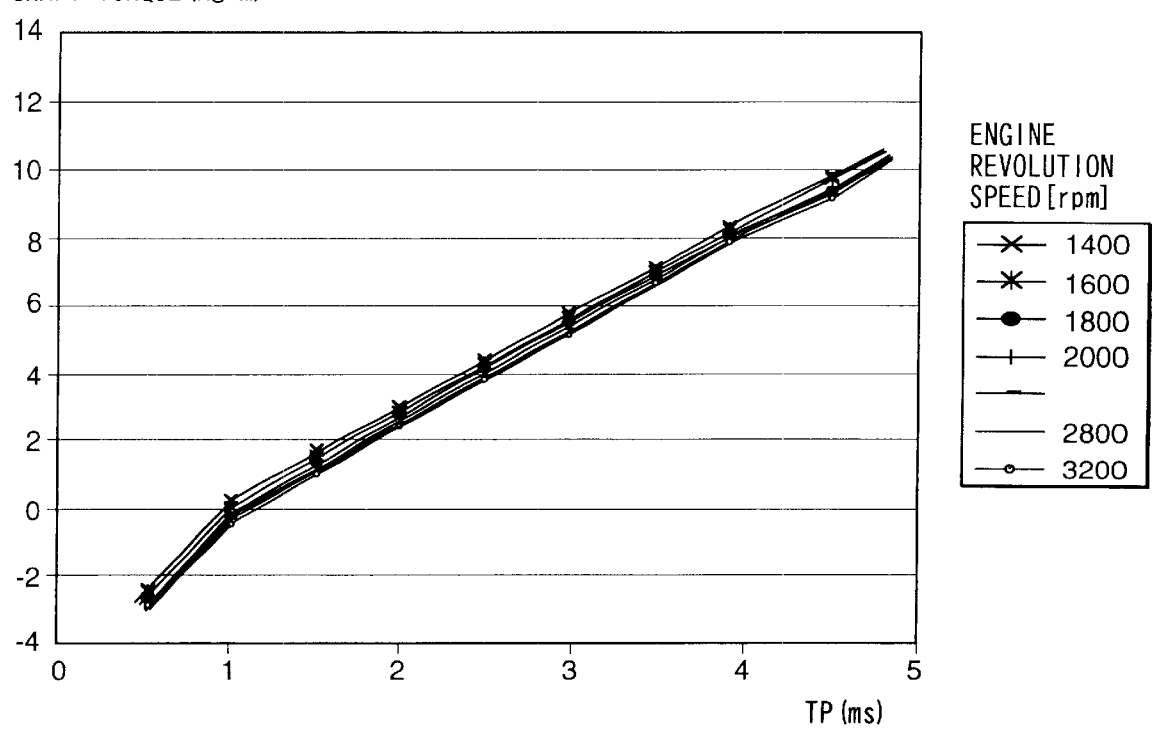
FIG. 25 is an illustration showing an example of an engine characteristics.

FIG. 25 shows an example of measured values of the basic fuel injection amount Tp1 (at stoichiometric mixture) (actually measured Tp) and an axial torque of the engine, with taking the engine revolution speed as parameter. Since characteristics will never be changed even when the engine revolution speed is varied, it is convenient for mutual conversion of the torque and Tp. Thus, a table is established in terms of the basic fuel injection amount Tp1 (at stoichiometric mixture) (actually measured Tp) and an axial torque of the engine for use in the torque-Tp converting means 1105. The same table is also used for deriving the torque from Tp by the reference fuel injection amount Tp-torque converting means 1108 by reverse retrieval.

Next, detailed discussion will be given for operations in respective part illustrated in FIGS. 3 and 4 as basic part of the present invention.

Figure 7:
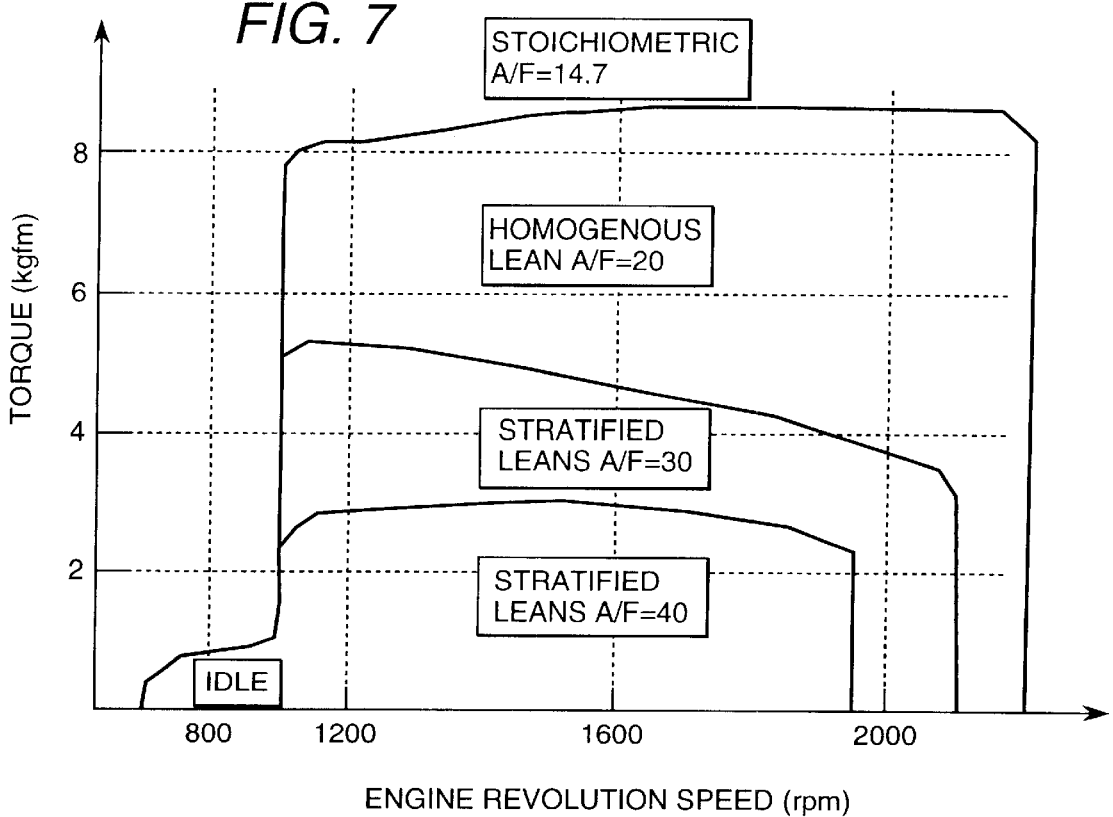
FIG. 7 is an illustration showing an example of setting of an air/fuel ratio of the engine control system.

FIG. 7 illustrates an air/fuel ratio setting map (I) of the engine 507 of the shown embodiment. On the basis of the air/fuel ratio setting map shown in FIG. 7, three maps for stoichiometric mixture combustion, homogeneous lean combustion and stratified lean combustion shown in FIG. 3 are established. As can be seen from the map, air/fuel ratio in idling range is set at 40. However, the map illustrated in FIG. 7 is warmed engine condition, and in cold-engine state, stable stratified lean combustion cannot be performed. Therefore, under cold-engine condition, combustion mode in the idling range becomes stoichiometric combustion. Therefore, map look-up is performed against the map for stoichiometric combustion in terms for retrieving parameter.

Combustion modes set forth above is selected by combustion mode switching means 120 in FIG. 3. Content of process will be discussed hereinafter with reference to FIG. 8.

Figure 8:
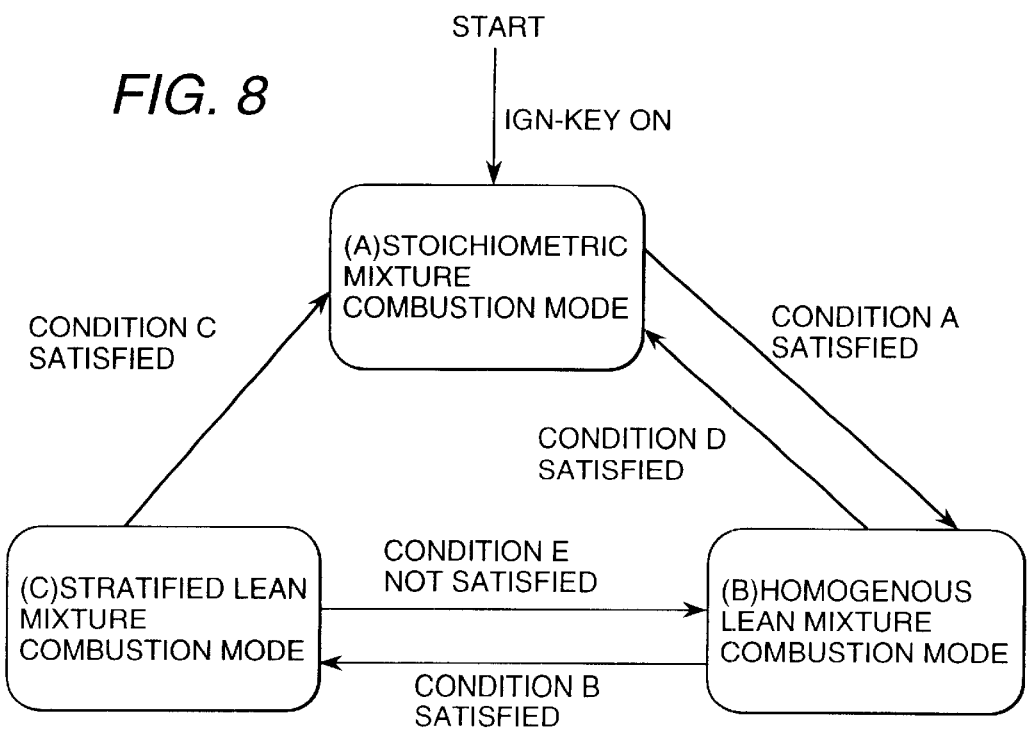
FIG. 8 is diagrammatically illustration showing a state transition of combustion mode switching means of the engine control system.

FIG. 8 is a state transition chart of the combustion mode switching means 120. Upon starting up of the engine 507, at first, the combustion mode becomes stoichiometric mixture combustion mode (A). For transition from the stoichiometric mixture combustion mode to homogenous lean combustion mode (B), the following condition A has to be satisfied. On the other hand, when the following condition B is satisfied during homogenous lean combustion mode (B), the combustion mode transits to the stratified lean combustion mode (C). When the following condition C is satisfied during stratified lean combustion mode (C), the combustion mode transits to the stoichiometric mixture combustion mode (A). When the following condition E is satisfied during stratified lean combustion mode (C), the combustion mode transits to the homogenous lean combustion mode (B).

When the following condition D is satisfied during homogenous lean combustion mode (B), the combustion mode transits to the stoichiometric mixture lean combustion mode (A).

Respective conditions are as follows:
Condition A: all of conditions A1 to A3 are satisfied:
　　A1: A target A/F retrieved against stoichiometric air/fuel ratio map is greater than or equal to 20;
　　A2: An engine coolant temperature TWN is higher than or equal to 40° C.; and
　　A3: An engine start-up enrichment coefficient is zero (0).
Condition B: A target A/F retrieved against homogenous lean air/fuel ratio map is greater than or equal to 30;
Condition C: A fuel cut-off condition in deceleration state is satisfied.
Condition D: : A target A/F retrieved against homogenous lean air/fuel ratio map is less than or equal to 19.
Condition E: : A target A/F retrieved against stratified lean air/fuel ratio map is smaller than or equal to 28.

Once the combustion mode is determined by the combustion mode switching means of FIG. 3 as set forth above, set values for ignition timing control, fuel injection timing control and EGR ratio control are also retrieved from maps of the corresponding modes in addition to the air/fuel ratio.

Figure 26:
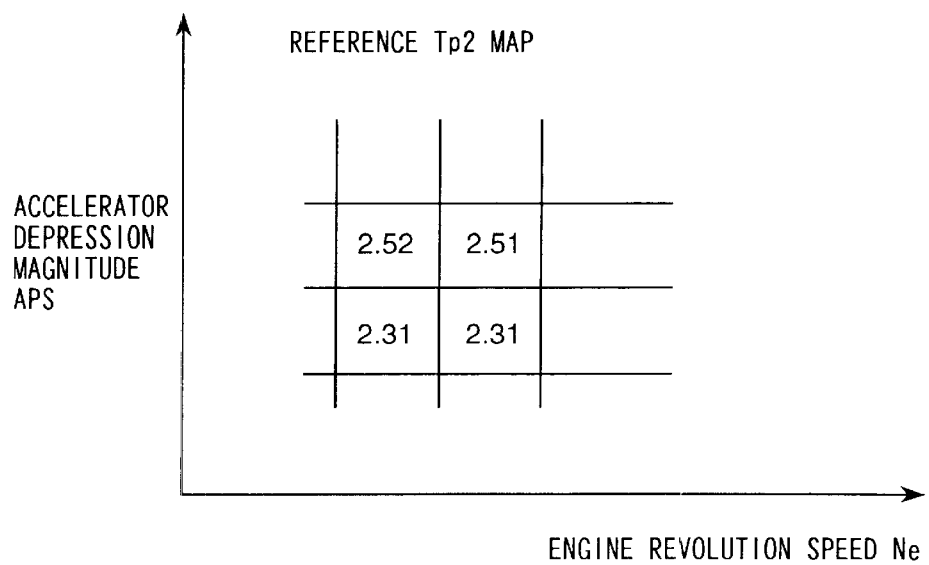
FIG. 26 is an illustration showing one example of a reference map of a basic injection amount Tp2 setting means of the engine control system of FIGS. 3 and 4.
Figures 27, 28:
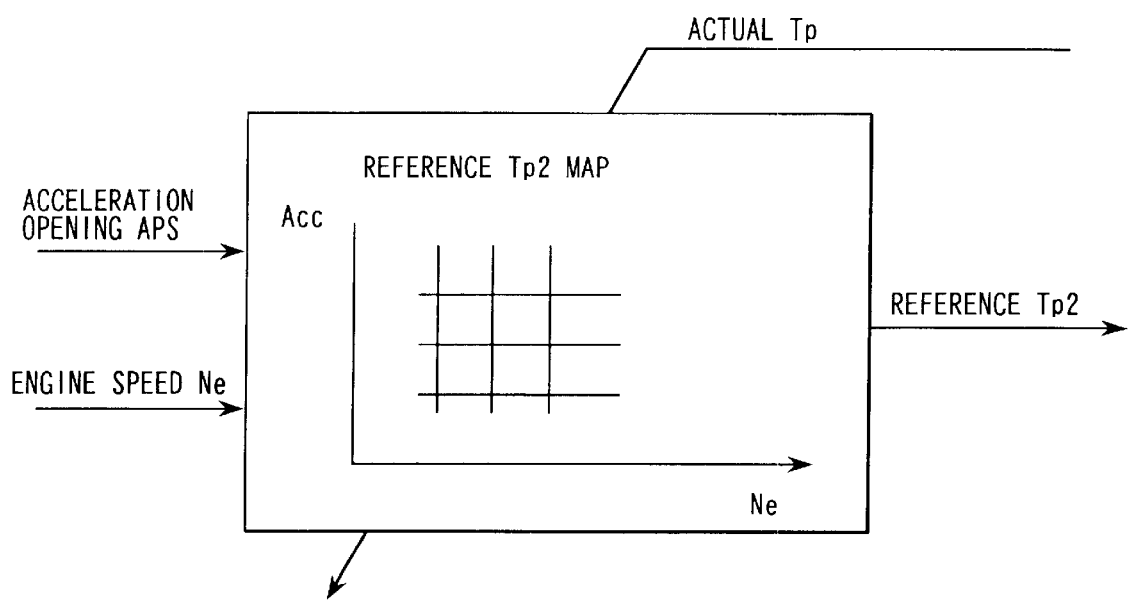
FIG. 27 is a block diagram showing the reference map of a basic injection amount Tp2 (reference map) setting means of the engine control system of FIGS. 3 and 4.
FIG. 28 is an illustration showing one example of a reference table of a basic injection amount Tp2 setting means of the engine control system of FIGS. 3 and 4.

FIG. 26 shows one example of the map of the reference fuel injection amount determining means 101 shown in FIG. 3. The set value of the map of the reference fuel injection amount Tp2 is preliminarily set so that the reference fuel injection amount Tp2 at stoichiometric mixture becomes equal to the basic fuel injection amount Tp1. However, as shown in FIG. 27, due to fluctuation in the sensors or the like in the actual vehicle, the reference fuel injection amount Tp2 has to be updated on the basis of the basic fuel injection amount Tp1 at stoichiometric mixture ratio. Therefore, the reference fuel injection amount Tp2 map is re-writable for updating.

Figure 29:
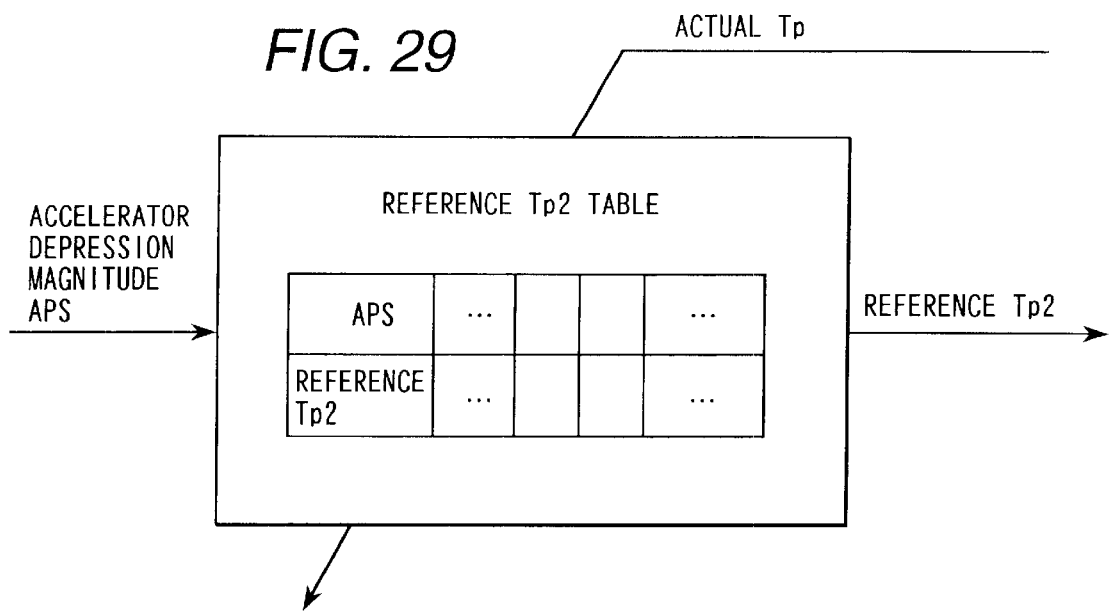
FIG. 29 is a block diagram showing the reference map of a basic injection amount Tp2 (reference table) setting means of the engine control system of FIGS. 3 and 4.

Next, FIG. 28 shows an example of setting of the reference fuel injection amount Tp2 as a table of the accelerator open degree. The set values of the table of the reference fuel injection amount Tp2 is preliminarily set so that set so that the reference fuel injection amount Tp2 at stoichiometric mixture becomes equal to the basic fuel injection amount Tp1. However, as shown in FIG. 29, due to fluctuation in the sensors or the like in the actual vehicle, the reference fuel injection amount Tp2 has to be updated on the basis of the basic fuel injection amount Tp1 at stoichiometric mixture ratio. Therefore, the reference fuel injection amount Tp2 map is re-writable for updating.

Figure 9:
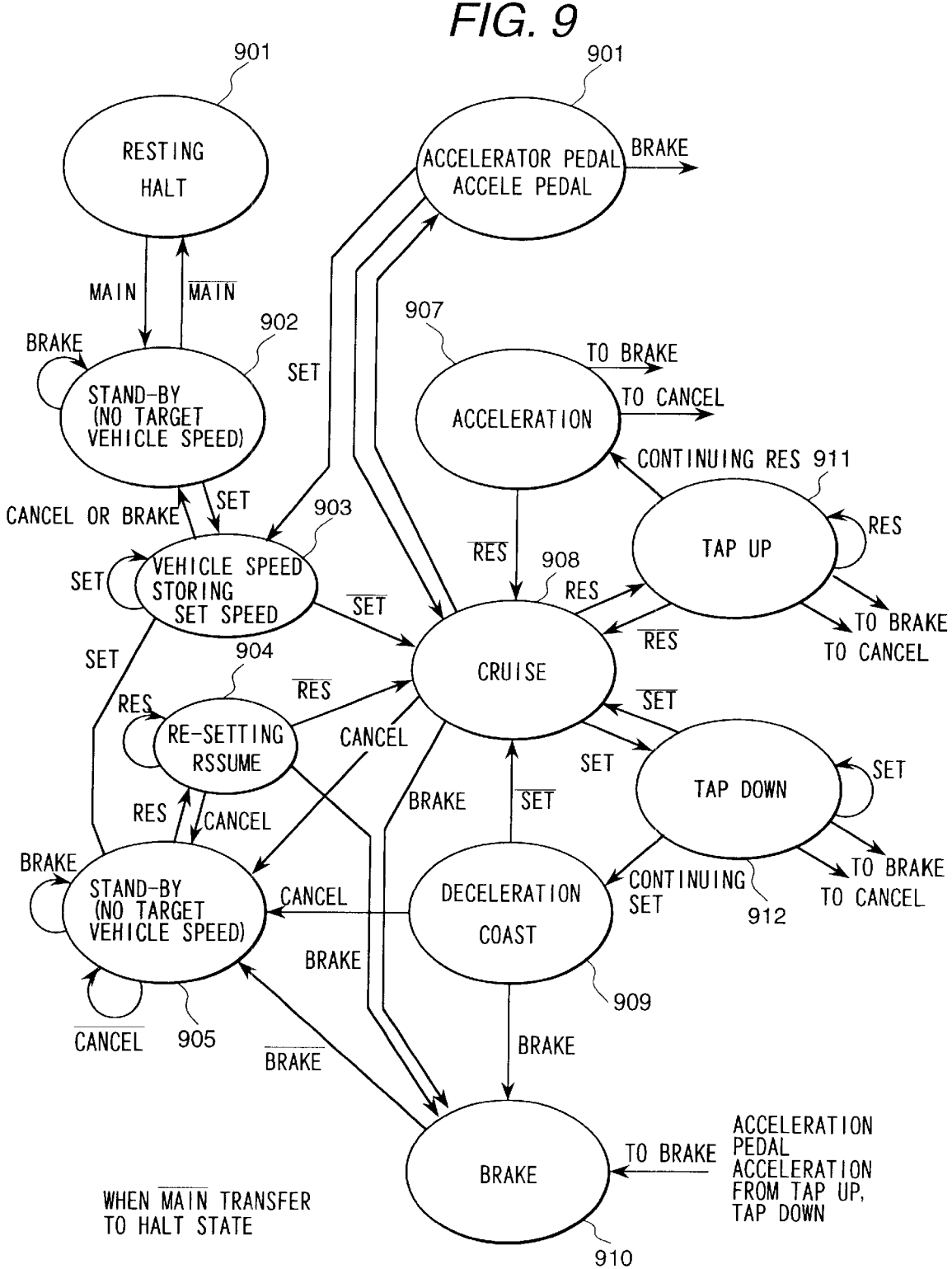
FIG. 9 is a diagrammatic illustration showing a state transition in an automatic cruise control.

FIG. 9 is a state transition chart of control mode in the case where the present invention is applied to automatic cruise control system. The control mode is initially set at resting mode 901. When the driver turns a MAIN SW ON, the control mode transit to stand-by mode 902. From all state, the control mode returns to the resting mode in response to turning OFF of the MAIN SW.

In the stand-by mode, the driver is manually operating the accelerator for driving the vehicle and the automatic cruise control system is waiting for setting of the target vehicle speed. At this condition, when a SET/COAST SW is turned ON, the control mode transit to a vehicle speed storing mode 903.

The vehicle speed storing mode 903 is maintained while the SET/COAST SW is maintained in ON position. In response to turning OFF of the SET/COAST SW, the control mode transit to cruise mode 908.

In the cruise mode 908, a vehicle speed control is performed toward the target vehicle speed. Here, by turning ON a RES/ACCEL SW, the control mode transit to a tap-up mode 911. On the other hand, by turning ON the SET/COAST SW, the control mode transit to tap-down mode 912. Also, by turning ON a CANCEL SW, the control mode transit to a cancel mode 905. On the otherhand, if judgment is made that the reference torque KIJUNTRQ is greater than or equal to the target engine torque TGENGTRQ in the torque judgment means of FIG. 2, the control mode transit to an accelerator pedal mode 906.

In the tap-up mode 911, upon transition from ON state to OFF state of the RES/ACCEL SW, the operational state transit to cruising state with increasing the target vehicle speed by a predetermined value (e.g. 1 km/h). On the other hand, when the RES/ACCEL SW is maintained at ON state beyond a predetermined period (e.g. 0.5 sec.), the control mode transit to an acceleration mode 907.

In the acceleration mode 907, while the RES/ACCEL SW is maintained ON, the target engine torque is stepped up per a predetermined value. The acceleration mode 907 is terminated in response to turning OFF of the RES/ACCEL SW to transit to the cruise mode.

In the tap-down mode 912, upon transition from ON state to OFF state of the SET/COAST SW, the operational state transit to cruising state with decreasing the target vehicle speed by a predetermined value (e.g. 1 km/h). When the SET/COAST SW is maintained at ON state beyond a predetermined period (e.g. 0.5 sec.), the control mode transit to a deceleration mode 908.

In the deceleration mode 908, while the SET/COAST SW is maintained ON, the target engine torque is stepped down per a predetermined value. The deceleration mode 908 is terminated in response to turning OFF of the SET/COAST SW to transit to the cruise mode.

In the accelerator pedal mode 906, control is performed on the basis of the reference fuel injection amount Tp2 derived by adding the ISCTP for ISC to the reference Tp map retrieved value KIJUNTPM calculated with taking the accelerator open degree APS as input. When a relationship of reference torque KIJUNTRQ≦target engine torque TGENGTRQ is not satisfied, the control mode transits to cruise mode 908.

A brake mode 910 is entered from the cruise mode 908, the accelerator pedal mode 906, the acceleration mode 907, the tap-up mode 912, the deceleration mode 909, re-setting mode 904 in response to turning ON of brake SW. In the brake mode 910, the target engine torque TGENGTRQ is set at a minimum value. When the brake SW is turned OFF during brake mode, the control mode transits to a cancel mode 905.

In the cancel mode 905, when the SET/COAST SW is turned ON, the control mode transits to the vehicle speed storing mode 903, and when the RES/ACCEL SW is turned on, the control mode transit to re-setting mode 904.

In there-setting mode 904, when the RES/ACCEL SW is turned OFF, the control mode transits to cruise mode.

The foregoing is state transition in the automatic cruise control. The process is performed by the state transition judgment means of FIG. 2, and the result is output to the fuel injection amount selecting means 1107.

Figure 10:
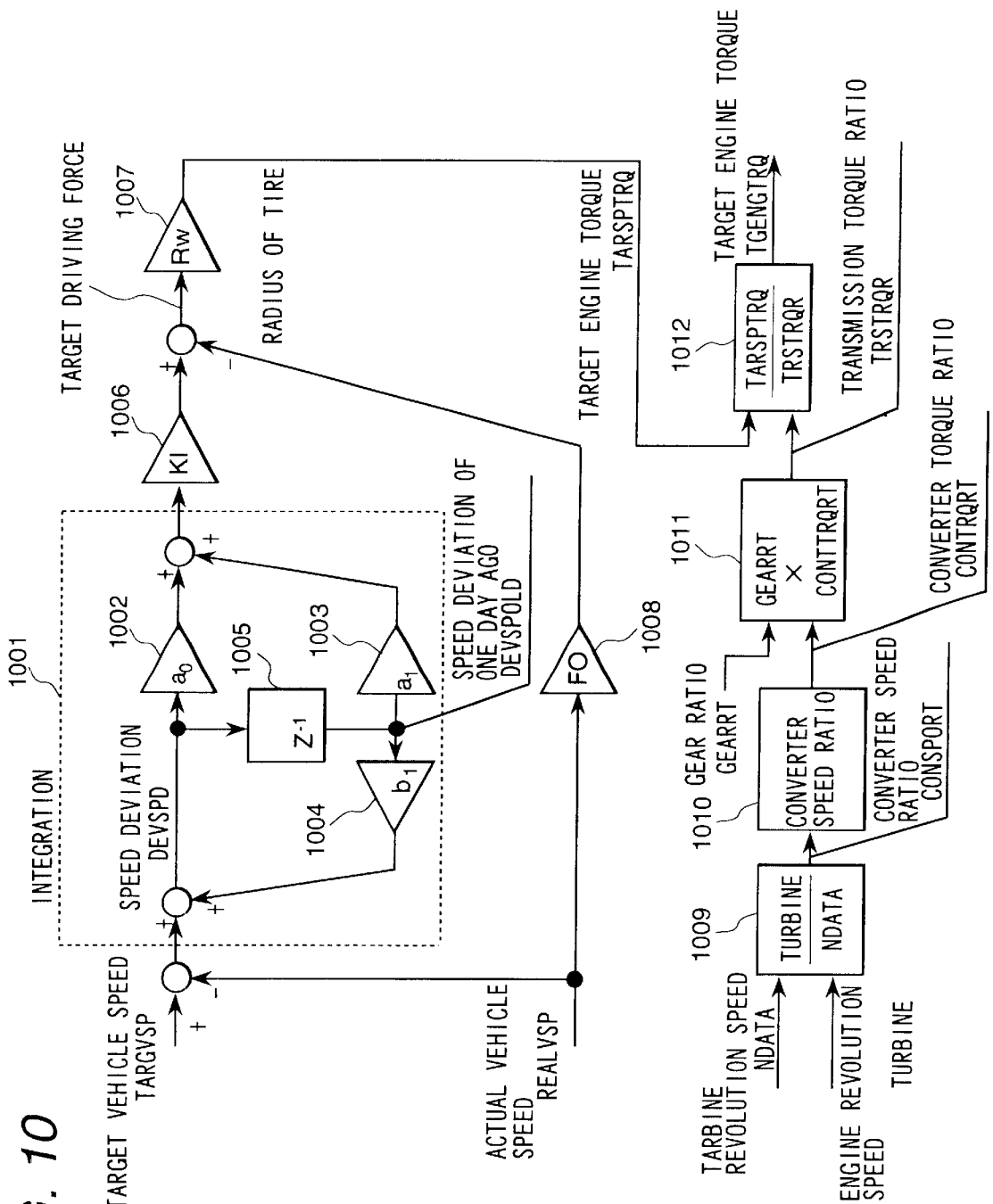
FIG. 10 is a detailed block diagram of a vehicle speed control means of FIG. 2.

FIG. 10 shows a detail of the vehicle speed control means 1106 shown in FIG. 2. The vehicle speed control means 1106 derives the target engine torque TGENGTRQ on the basis of the target vehicle speed TARGVSP and the current vehicle speed REALVSP. Upper half of FIG. 10 is a feedback control portion to calculates once in a form of target driving shaft torque, and then corrected into the engine torque in the lower half. Initially, a difference between the target vehicle speed TARGVSP and the current vehicle speed REALVSP is calculated to input to an integrator 1001.

The integrator 1001 is consisted of a Z operator indicative of a value I in one preceding calculation cycle and coefficients 1002, 1003 and 1004. Subsequently, the integrated value is multipled by a control gain KI (1006). Subsequently, from the product calculated by multiplying the integrated value by the control gain KI (1006), a product calculated by multiplying the current vehicle speed REALVSP by a control gain F0 (1008), is subtracted. The resultant value serves as a target driving force. Then, by multiplying the target driving force by a coefficient 1007 corresponding to a tire radius, the target driving shaft torque TARSPTRQ. The target driving shaft torque is a torque developed on the tire. Therefore, the target driving shaft torque is divided by a transmission torque ratio for correcting into the engine shaft torque.

Calculation of the transmission torque ratio TRSTRQR is performed by initially calculating a ratio of an engine revolution speed NDATA and a turbine speed TURBINE at 1009 to derive a torque converter speed ratio and then deriving a converter torque ratio CONTRQRT by table look-up in terms of the torque converter speed ratio. By multiplying the converter torque ratio CONTRQRT by a gear ratio GEARRT, the transmission torque ratio TRSTTRQR is derived. For simplification of arithmetic operation, it is preferred to preliminarily set a differential gear ratio. Finally, the transmission torque TRSTRQR is subtracted from the target drive shaft TARSPTRQ.

Discussion has been about state transition judgment means 1110 with reference to FIG. 9, hereinabove. More particular process will be discussed in greater detail with reference to FIGS. 11 to 24, in which FIG. 11 is a flowchart showing an overall process and FIGS. 12 to 24 are flowchart in each model.

Figure 11:
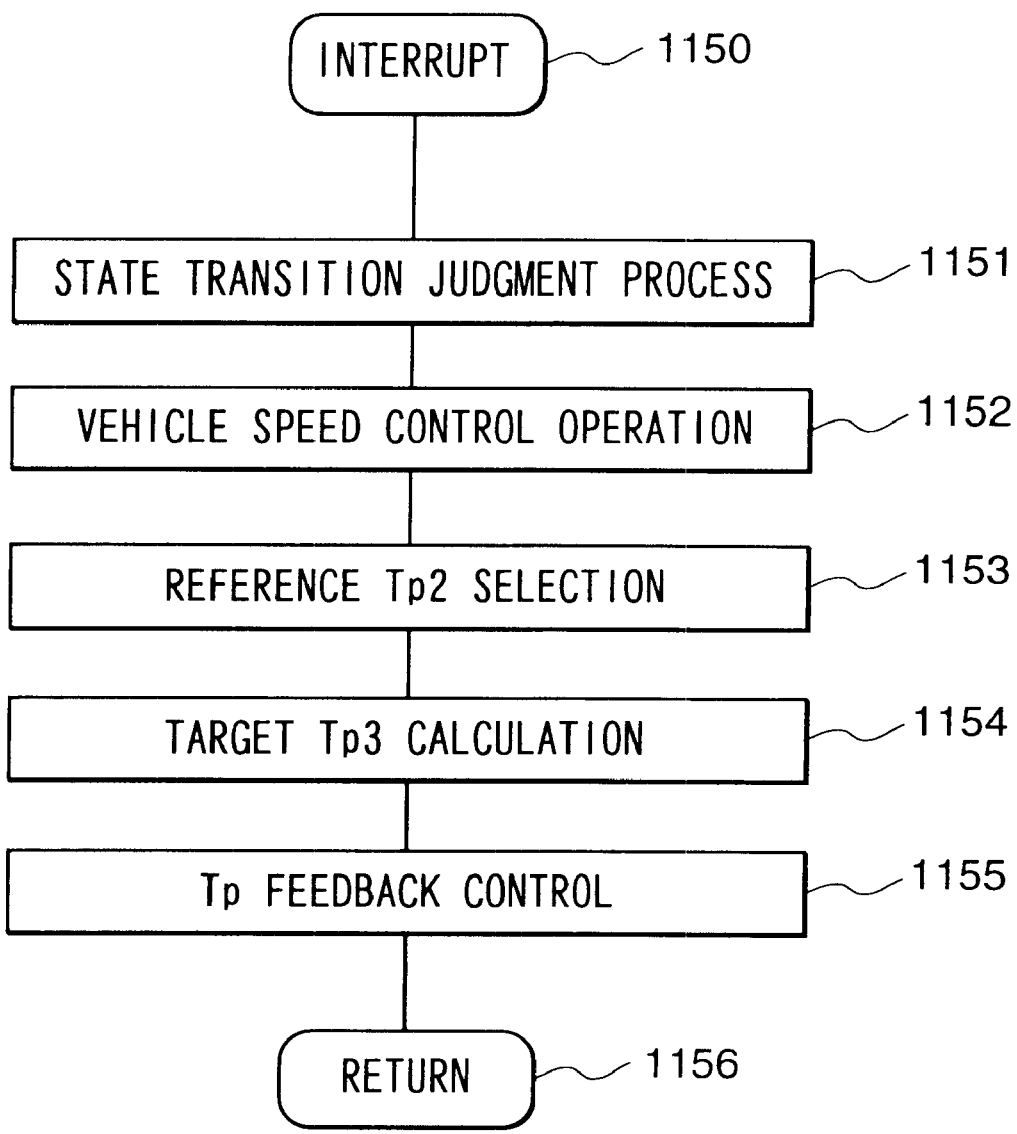
FIG. 11 is a general flowchart showing overall control in the control system of FIG. 1.

FIG. 11 is a flowchart of the overall process which will be triggered initially by periodic interrupt 1150. Trigger period may be 10 msec., for example. At step 1151, a state transition judgment process is performed, which process corresponds to the state transition judgment means 1110 of FIG. 2. In step 1151, state transition as illustrated in FIG. 9 is governed. Detail of the process will be discussed with reference to FIGS. 12 to 24 later.

A content of process at vehicle speed control arithmetic process 1152 is equivalent to that illustrated and set forth with reference to FIG. 10.

At step 1153, selection of Tp2 is performed. The process to be performed at step 1153 corresponds to the fuel injection amount selecting means 1107 of FIG. 2. At step 1154, calculation of the target Tp3 is perform, which process corresponding to the block 124 as shown in FIG. 1 or 4. At step 1155, Tp feedback control process is performed, which process corresponds to Tp control means 118 in FIG. 1.

Figure 12:
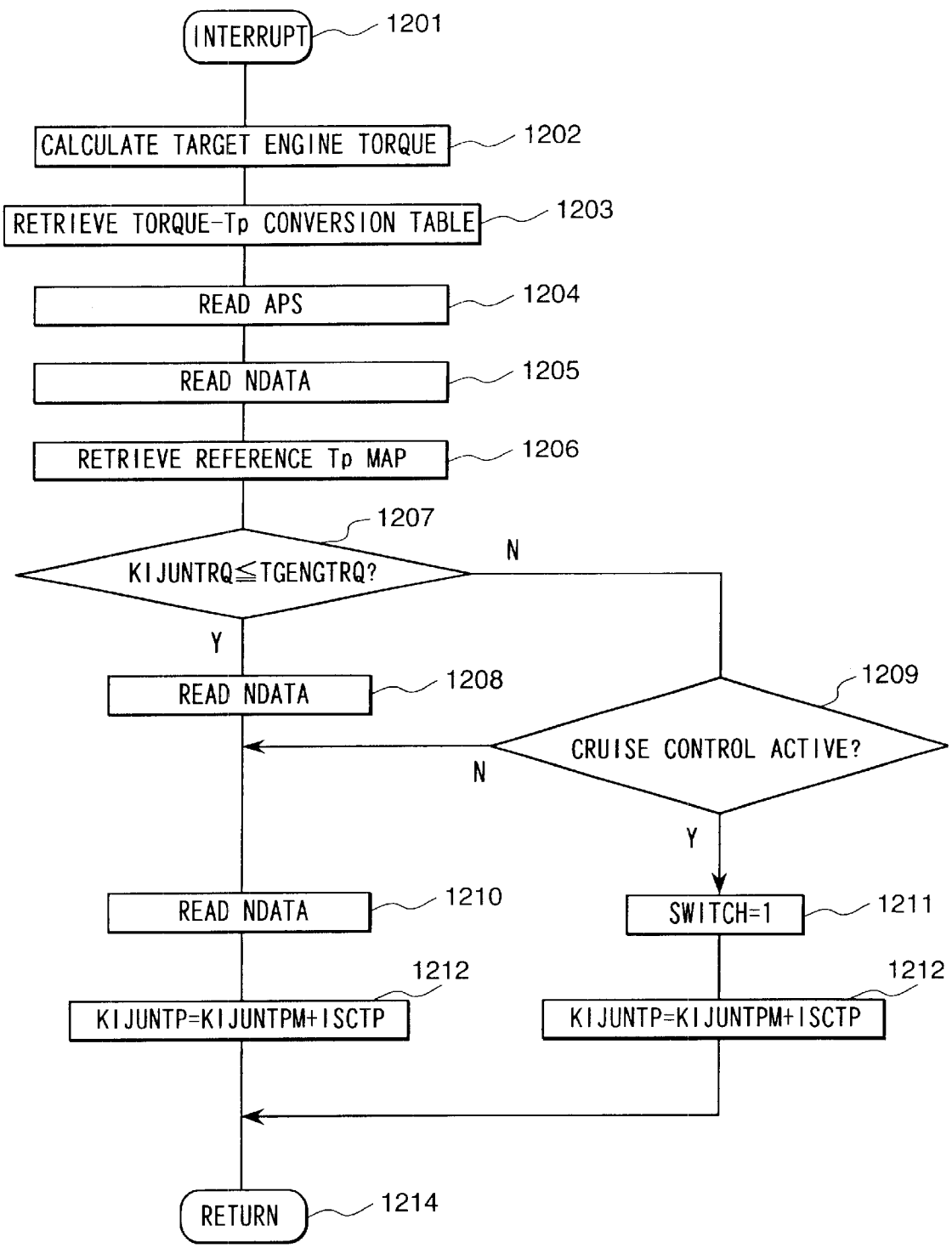
FIG. 12 is a flowchart showing a detail of a part of the flowchart of FIG. 1.

FIG. 12 illustrates in detail a logic in the state transition judgment means 1110 of FIG. 12 and the fuel injection amount selecting means 1107. At first, process is initiated by periodic interrupt process at step 1201. At step 1202, the target engine torque is calculated through the process set forth in connection with FIG. 10. At step 1203, table look-up is performed against a torque-Tp conversion table through the process set forth in connection with the torque-Tp conversion means of FIG. 2. The torque-Tp conversion table is established by approximation of the characteristic chart of FIG. 25. At step 1204, the accelerator depression magnitude ASP is read out. At step 1205, an engine revolution speed NDATA is read out. At step 1206, map look-up is performed against the reference TP map, which process corresponds to 101 of FIG. 2. Then, at step 1207, judgment is made whether KIJUNTRQ≧TGENGTRQ is true or false. If true, transition to the accelerator pedal mode is determined at step 1208. Then, at subsequent step 1202, a signal to be output to the fuel injection amount selecting means 1107 is set to SWITCH=0. Then, process of the fuel injection amount selection means 1107 by the following expression (1) is selected at step 1212 for outputting the torque corresponding to depression magnitude of the accelerator of the engine.

$$KIJUNTP=KIJUNTPM+ISCTP \tag{1}$$

ISCTP in the foregoing expression (1) corresponds to $\Delta Tp2$ output from an idling speed control means 116 of FIG. 4.

If false is judged at step 1207, namely, if KIJUNTRQ<TGENGTRQ, the control mode is checked whether the control mode is one of the cruise mode, the tap-up mode, the tap-down mode, the acceleration mode or the deceleration mode, namely if the automatic cruise control is active, or not at step 1209. If the automatic cruise control is active and thus the control mode is one of the cruise mode, the tap-up mode, the tap-down mode, the acceleration mode or the deceleration mode, the signal indicative of SWITCH=1 is output to the fuel injection amount selection means 1107. Subsequently, at step 1213, process of the fuel injection amount selection means 1107 by the following expression (2) is selected at step 1212 for outputting the torque necessary for adjusting the vehicle speed toward the target vehicle speed set for cruising.

$$KIJUNTP=CRUISTP+ISCTP \tag{2}$$

If the false is judged at step 1209, namely, the automatic cruise control is not active, such as in resting mode, canceling mode or the like, the process is advanced to step S1210 for performing accelerator pedal mode control set forth above.

At step 1209, branching should be differentiated depending upon the current control mode, i.e. one of the cruise mode, the tap-up mode, the tap-down mode, the accelerator pedal mode and the deceleration mode, mode determination, namely state transition will be discussed in detail with reference to FIGS. 13 to 24.

Figure 13:
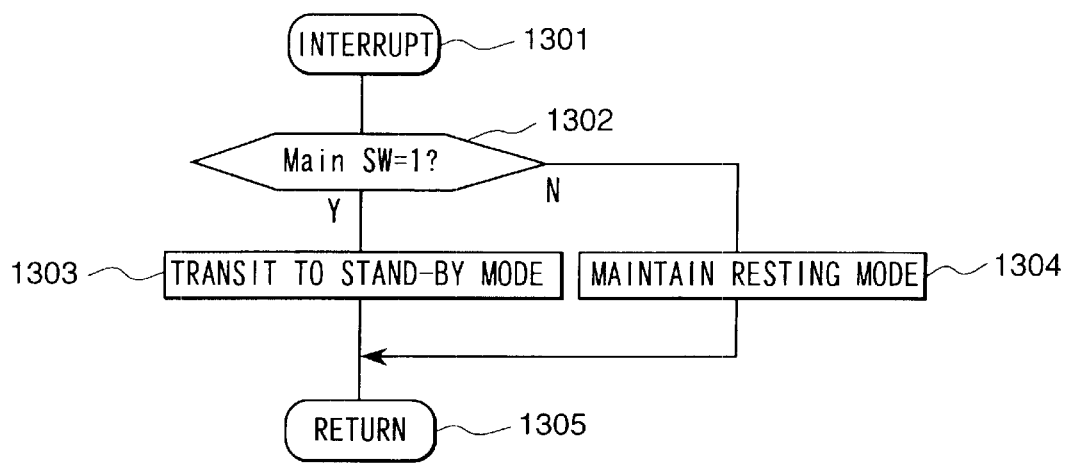
FIG. 13 is a flowchart showing a detail of a part of the flowchart of FIG. 11 for showing a state transition judgment process under a resting mode.

FIG. 13 is a flowchart showing a state transition judgment process in the resting mode.

At judgment step 1302, the state of the MAIN SW is checked. If the MAIN SW is ON, transition to stand-by mode is determined at step 1303. On the other hand, if the MAIN SW is OFF, the current resting mode is maintained.

Figure 14:
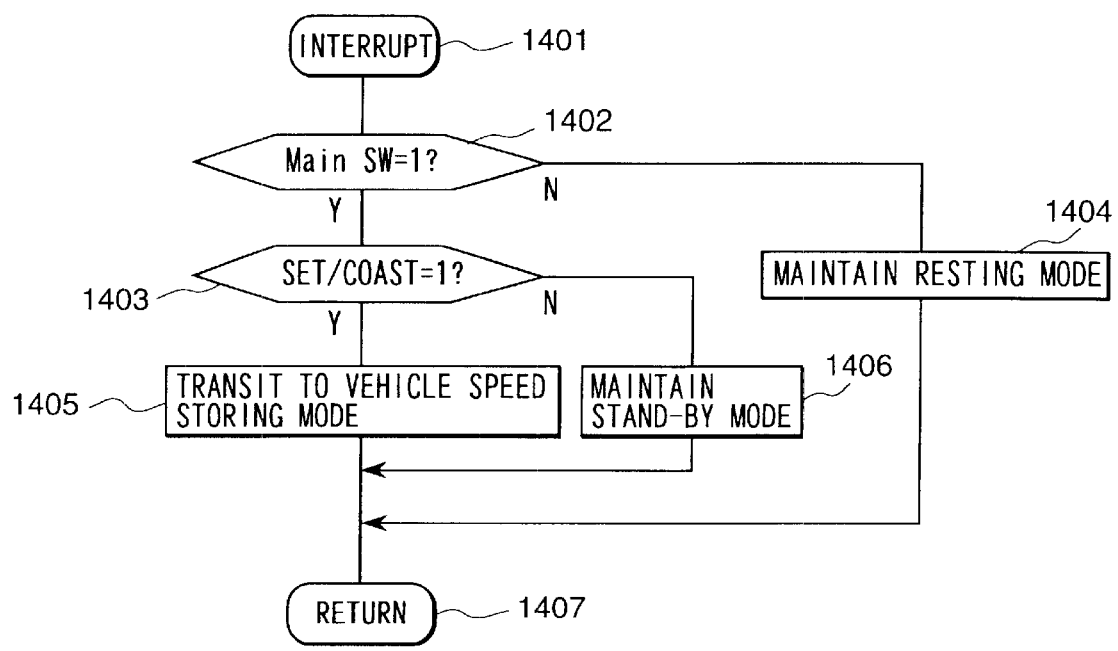
FIG. 14 is a flowchart showing a detail of a part of the flowchart of FIG. 11 for showing a state transition judgment process under a stand-by state.

FIG. 14 is a flowchart showing the state transition judgment process in the stand-by mode.

At judgment step 1402, the state of the MAIN SW is checked. If the MAIN SW is ON, the process jumps to judgment step 1403 and if the MAIN SW is OFF, the process jumps to step 1404 to determine transition to the resting mode. At judgment step 1403, the state of the SET/COAST SW is checked. If the SET/COAST SW is ON, transition to the vehicle speed storing mode is determined at step 1405. If the SET/COAST SW is OFF, the current stand-by mode is maintained.

Figure 15:
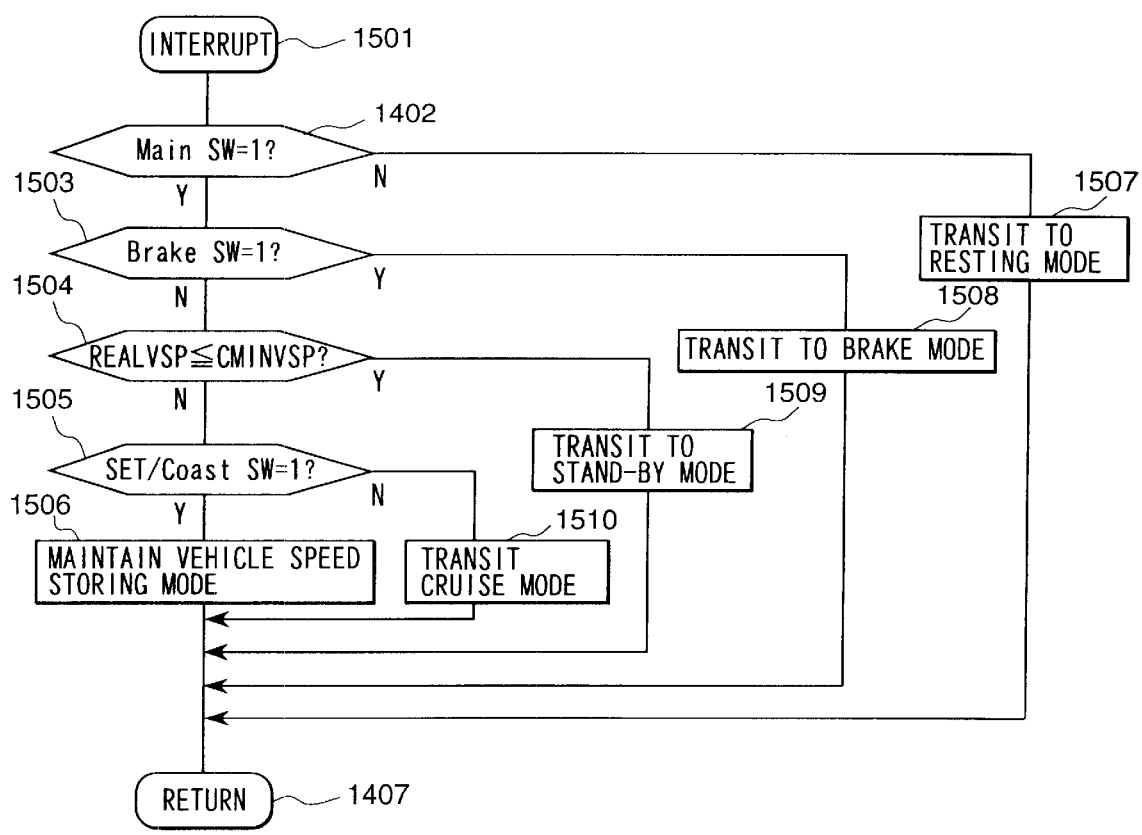
FIG. 15 is a flowchart showing a detail of a part of the flowchart of FIG. 11 for showing a state transition judgment process under a vehicle speed storing mode.

FIG. 15 is a flowchart showing the state transition judgment process in the vehicle speed storing mode.

At judgment step 1502, the state of the MAIN SW is checked. If the MAIN SW is ON, the process jumps to judgment step 1503 and if the MAIN SW is OFF, the process jumps to step 1507 to determine transition to the resting mode. At judgment step 1503, state of the brake SW is checked. If the brake SW is OFF, the process jumps to step 1504 and if the brake SW is ON, the process jumps to step 1508 to determine transition to the brake mode. At judgment step 1504, check is performed whether current vehicle speed REALVSP≦cruising lower limit vehicle speed CMINVSP is true or false. If true, the process jumps to step 1509 to determine transition to the stand-by mode, and if false, the process jumps to judgment step 1505. At judgment step 1505, state of the SET/COAST SW is checked. If the SET/COAST SW is ON, transition to the vehicle speed storing mode is maintained at step 1506. On the other hand, if the SET/COAST SW is OFF, transition to the cruise mode is determined at step 1510.

Figure 16:
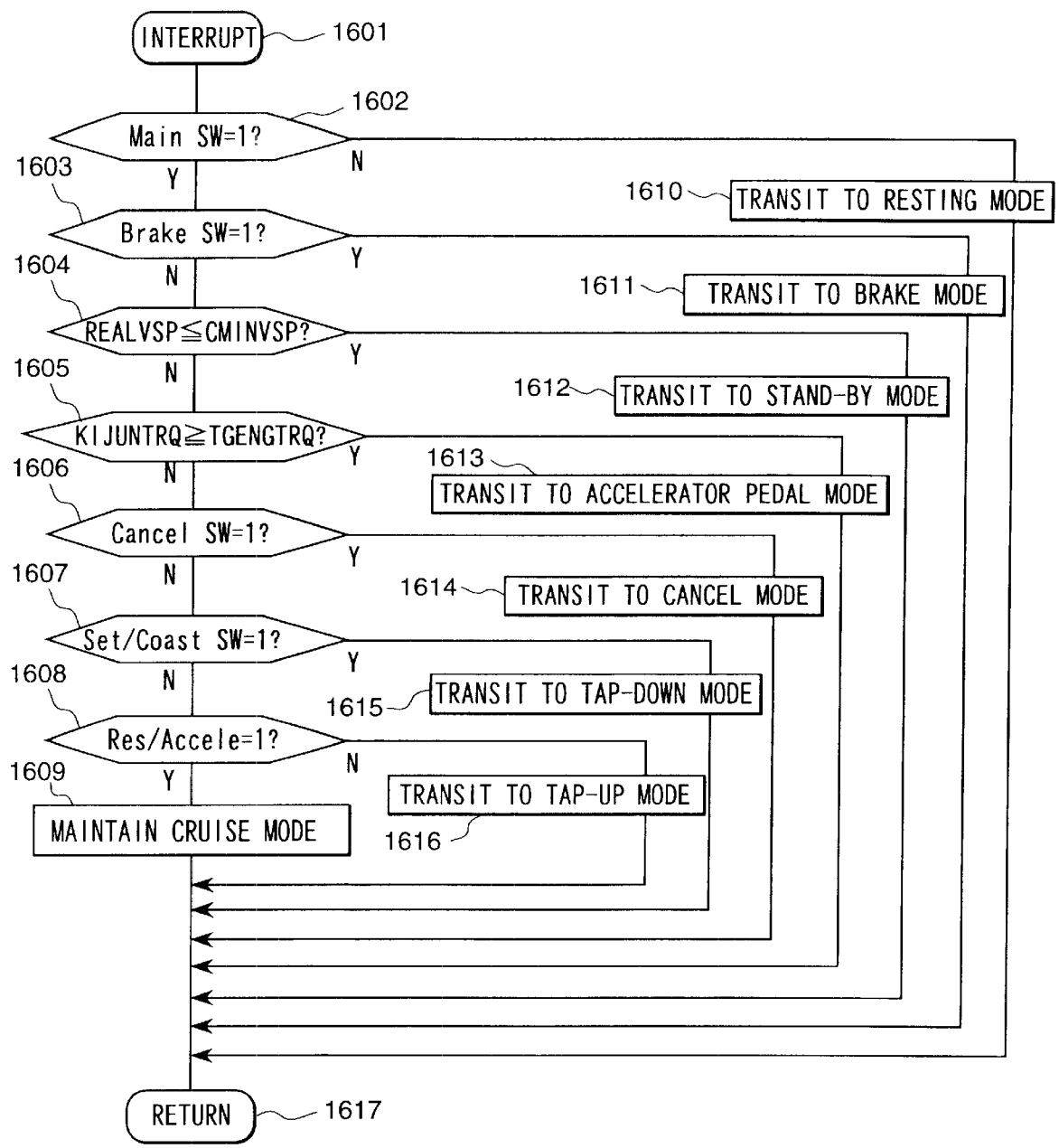
FIG. 16 is a flowchart showing a detail of a part of the flowchart of FIG. 11 for showing a state transition judgment process under a cruise mode.

FIG. 16 is a flowchart showing the state transition judgment process in the cruise mode.

At judgment step 1602, the state of the MAIN SW is checked. If the MAIN SW is ON, the process jumps to judgment step 1603 and if the MAIN SW is OFF, the process jumps to step 1610 to determine transition to the resting mode. At judgment step 1603, state of the brake SW is checked. If the brake SW is OFF, the process jumps to step 1604 and if the brake SW is ON, the process jumps to step 1611 to determine transition to the brake mode. At judgment step 1604, check is performed whether current vehicle speed REALVSP≦cruising lower limit vehicle speed CMINVSP is true or false. If true, the process jumps to step 1612 to determine transition to the stand-by mode, and if false, the process jumps to judgment step 1605. At judgment step 1605, check is performed whether reference torque KIJUNTRQ≧target engine torque TGENGTRQ is true or false. If true, transition to accelerator pedal mode is determined at step 1613. If false, the process jumps to judgment step 1606. At judgment step 1606, the state of the CANCEL SW is checked. If the CANCEL SW is ON, transition to the cancel mode is determined at step 1614. On the other hand, if the CANCEL SW is OFF, the process jumps to judgment step 1607. At judgment step 1607, state of the SET/COAST SW is checked. If the SET/COAST SW is ON, transition to the tap-down mode is determined at step 1607. On the other hand, if the SET/COAST SW is OFF, the process jumps to judgment step 1608. At judgment step 1608, state of the RES/ACCEL SW is checked. If ON, transition to the tap-up mode is determined at step 1616. If OFF, the current cruise mode is maintained.

Figure 17:
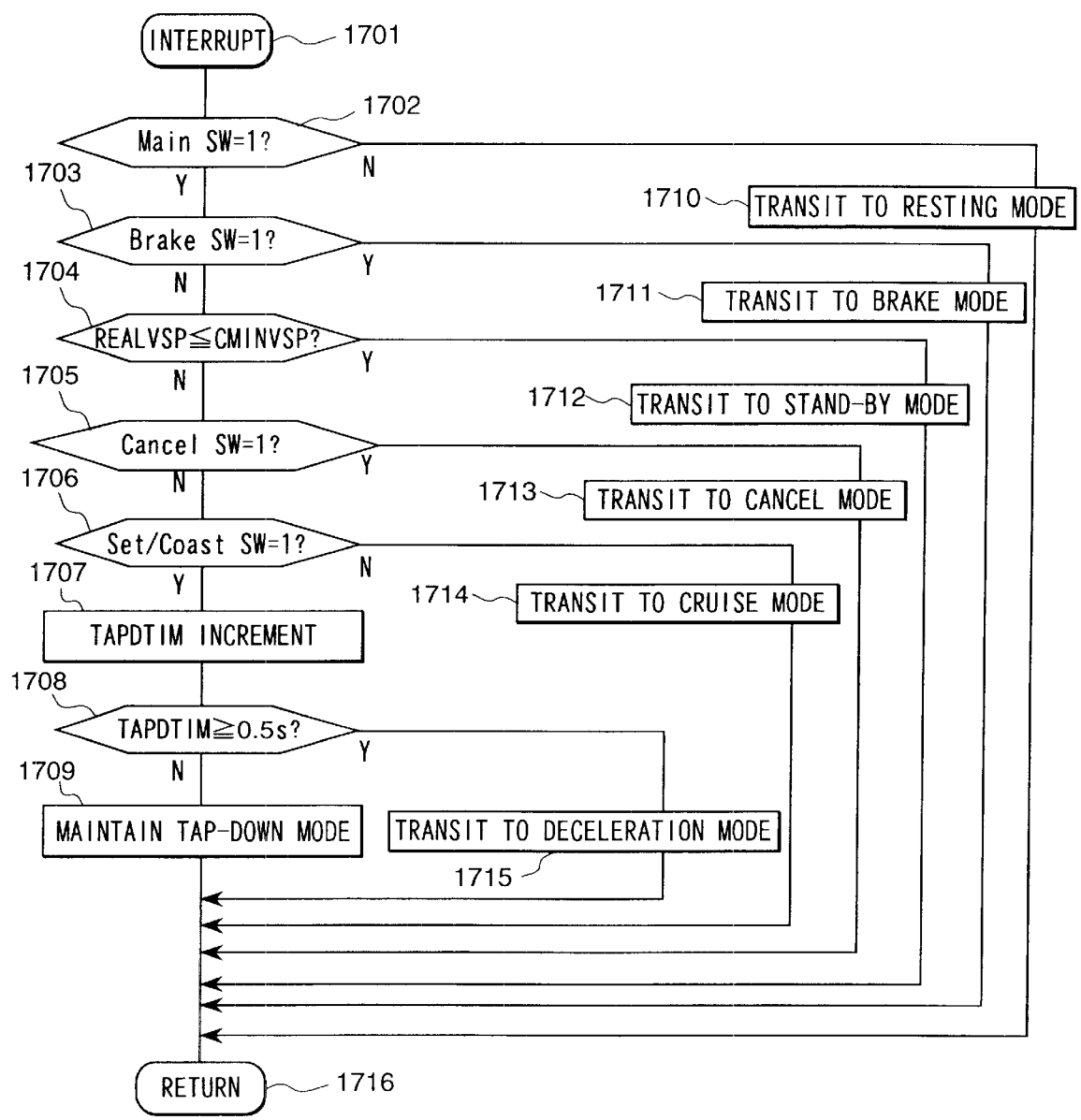
FIG. 17 is a flowchart showing a detail of a part of the flowchart of FIG. 11 for showing a state transition judgment process under tap-up mode.

FIG. 17 is a flowchart showing the state transition judgment process in the tap-down mode.

At judgment step 1702, the state of the MAIN SW is checked. If the MAIN SW is ON, the process jumps to judgment step 1703 and if the MAIN SW is OFF, the process jumps to step 1710 to determine transition to the resting mode. At judgment step 1703, state of the brake SW is checked. If the brake SW is OFF, the process jumps to step 1704 and if the brake SW is ON, the process jumps to step 1711 to determine transition to the brake mode. At judgment step 1704, check is performed whether current vehicle speed REALVSP≦cruising lower limit vehicle speed CMINVSP is true or false. If true, the process jumps to step 1712 to determine transition to the stand-by mode, and if false, the process jumps to judgment step 1705. At judgment step 1705, state of the CANCEL SW is checked. If ON, transition to the cancel mode is determined. If OFF, the process jumps to judgment step 1706. At judgment step 1706, state of the SET/COAST SW is checked. If the SET/COAST SW is OFF, transition to the cruise mode is determined at step 1714. If the SET/COAST SW is ON, a tap-down timer TAPDTIM is incremented at step 1707. Then, at judgment step 1708, check is performed whether tap-down timer TAPDTIM≧0.5 sec. is true or false. If true, the process jumps to step 1715 to transit to the deceleration mode, and if false, tap-down made is maintained at step 1709.

Figure 18:
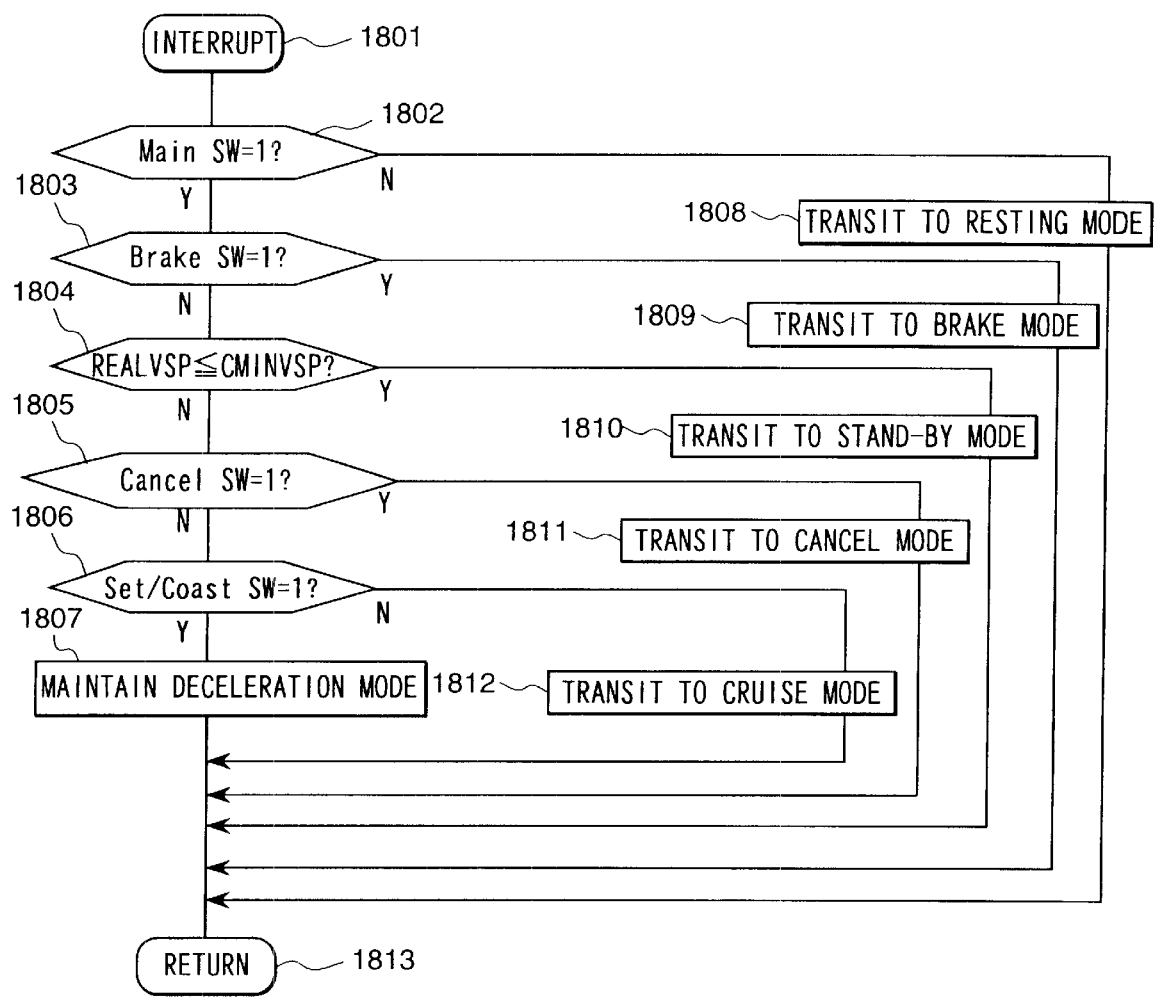
FIG. 18 is a flowchart showing a detail of a part of the flowchart of FIG. 11 for showing a state transition judgment process under deceleration mode.

FIG. 18 is a flowchart showing the state transition judgment process in the deceleration mode.

At judgment step 1802, the state of the MAIN SW is checked. If the MAIN SW is ON, the process jumps to judgment step 1803 and if the MAIN SW is OFF, the process jumps to step 1808 to determine transition to the resting mode. At judgment step 1803, state of the brake SW is checked. If the brake SW is OFF, the process jumps to step 1804 and if the brake SW is ON, the process jumps to step 1809 to determine transition to the brake mode. At judgment step 1804, check is performed whether current vehicle speed REALVSP≦cruising lower limit vehicle speed CMINVSP is true or false. If true, the process jumps to step 1810 to determine transition to the stand-by mode, and if false, the process jumps to judgment step 1805. At judgment step 1805, state of the CANCEL SW is checked. If ON, transition to the cancel mode is determined. If OFF, the process jumps to judgment step 1706. At judgment step 1806, state of the SET/COAST SW is checked. If the SET/COAST SW is OFF, transition to the cruise mode is determined at step 1714. If the SET/COAST SW is ON, the process jumps 1807 to maintain the current deceleration mode.

Figure 19:
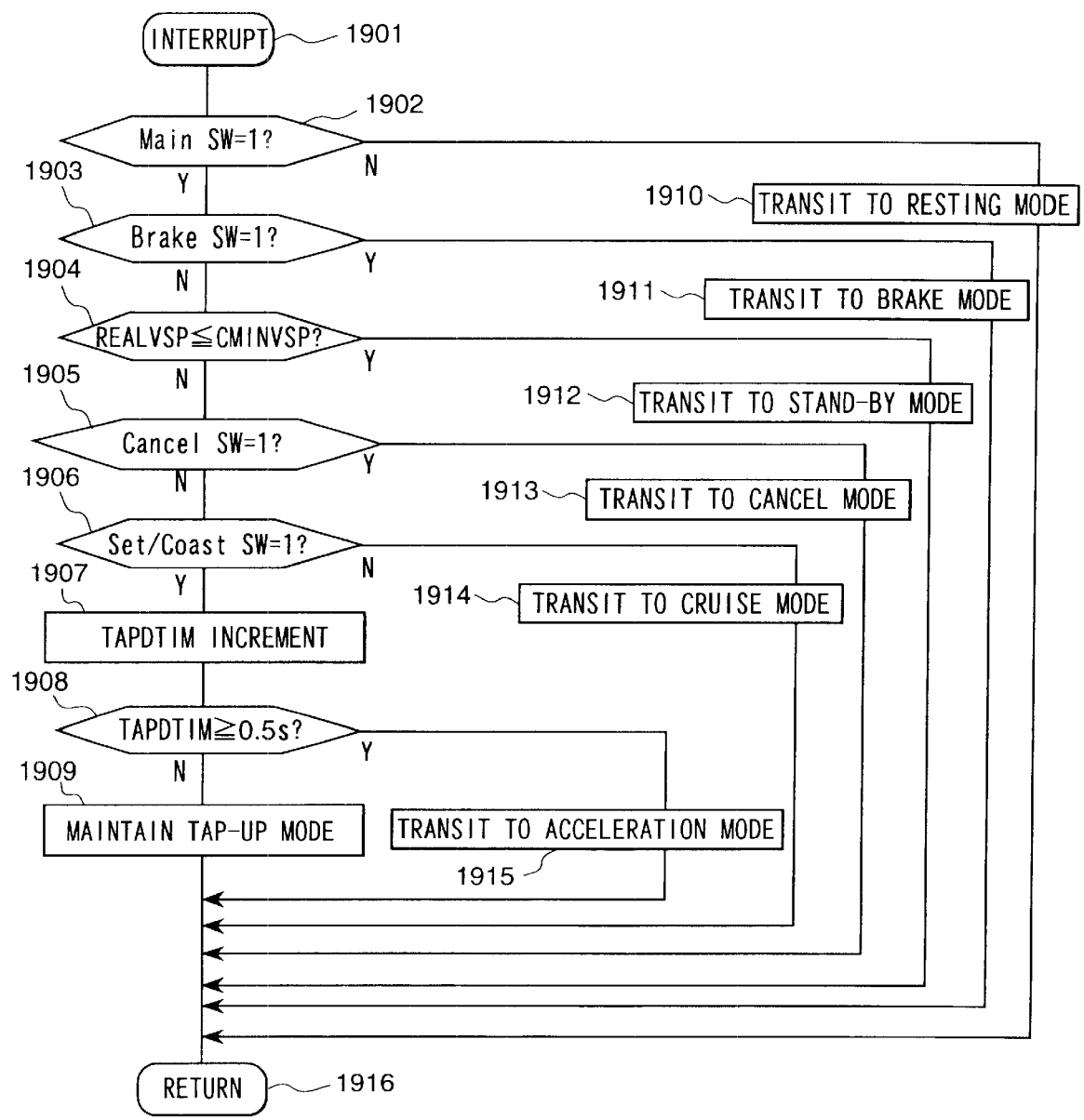
FIG. 19 is a flowchart showing a detail of a part of the flowchart of FIG. 11 for showing a state transition judgment process under a tap-up mode.

FIG. 19 is a flowchart showing the state transition judgment process in the tap-up mode.

At judgment step 1902, the state of the MAIN SW is checked. If the MAIN SW is ON, the process jumps to judgment step 1903 and if the MAIN SW is OFF, the process jumps to step 1910 to determine transition to the resting mode. At judgment step 1903, state of the brake SW is checked. If the brake SW is OFF, the process jumps to step 1904 and if the brake SW is ON, the process jumps to step 1911 to determine transition to the brake mode. At judgment step 1904, check is performed whether current vehicle speed REALVSP≦cruising lower limit vehicle speed CMINVSP is true or false. If true, the process jumps to step 1912 to determine transition to the stand-by mode, and if false, the process jumps to judgment step 1905. At judgment step 1905, state of the CANCEL SW is checked. If ON, transition to the cancel mode is determined. If OFF, the process jumps to judgment step 1906. At judgment step 1906, state of the SET/COAST SW is checked. If the SET/COAST SW is OFF, transition to the cruise mode is determined at step 1914. If the SET/COAST SW is ON, the process jumps to judgment step 1907.

At judgment step 1907, a tap-up timer TAPUTIM is incremented. Then, at judgment step 1908. check is performed whether tap-up timer TAPUTIM≧0.5 sec. is true or false. If true, the process jumps to step 1915 to transit to the acceleration mode. If false, the process jumps to step 1909 to maintain the current tap-up mode.

Figure 20:
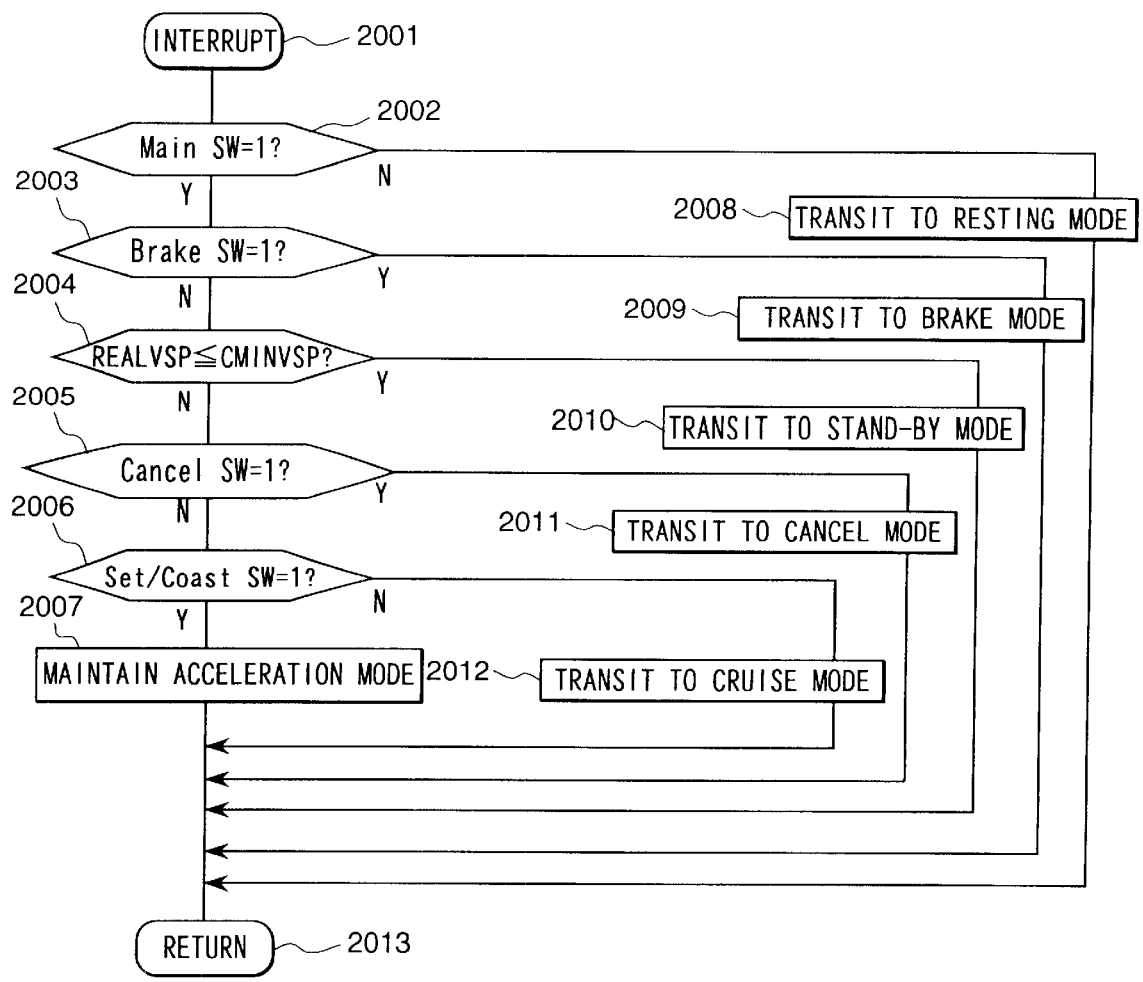
FIG. 20 is a flowchart showing a detail of a part of the flowchart of FIG. 11 for showing a state transition judgment process under an acceleration mode.

FIG. 20 is a flowchart showing the state transition judgment process in the acceleration mode.

At judgment step 2002, the state of the MAIN SW is checked. If the MAIN SW is ON, the process jumps to judgment step 2003 and if the MAIN SW is OFF, the process jumps to step 2004 to determine transition to the resting mode. At judgment step 2003, state of the brake SW is checked. If the brake SW is OFF, the process jumps to step 2004 and if the brake SW is ON, the process jumps to step 2009 to determine transition to the brake mode. At judgment step 2004, check is performed whether current vehicle speed REALVSP≦cruising lower limit vehicle speed CMINVSP is true or false. If true, the process jumps to step 2010 to determine transition to the stand-by mode, and if false, the process jumps to judgment step 2005. At judgment step 2005, state of the CANCEL SW is checked. If ON, transition to the cancel mode is determined. If OFF, the process jumps to judgment step 2006. At judgment step 2006, state of the RES/ACCEL SW is checked. If the RES/ACCEL SW is OFF, transition to the cruise mode is determined at step 2012. If the RES/ACCEL SW is ON, the current acceleration mode is maintained.

Figure 21:
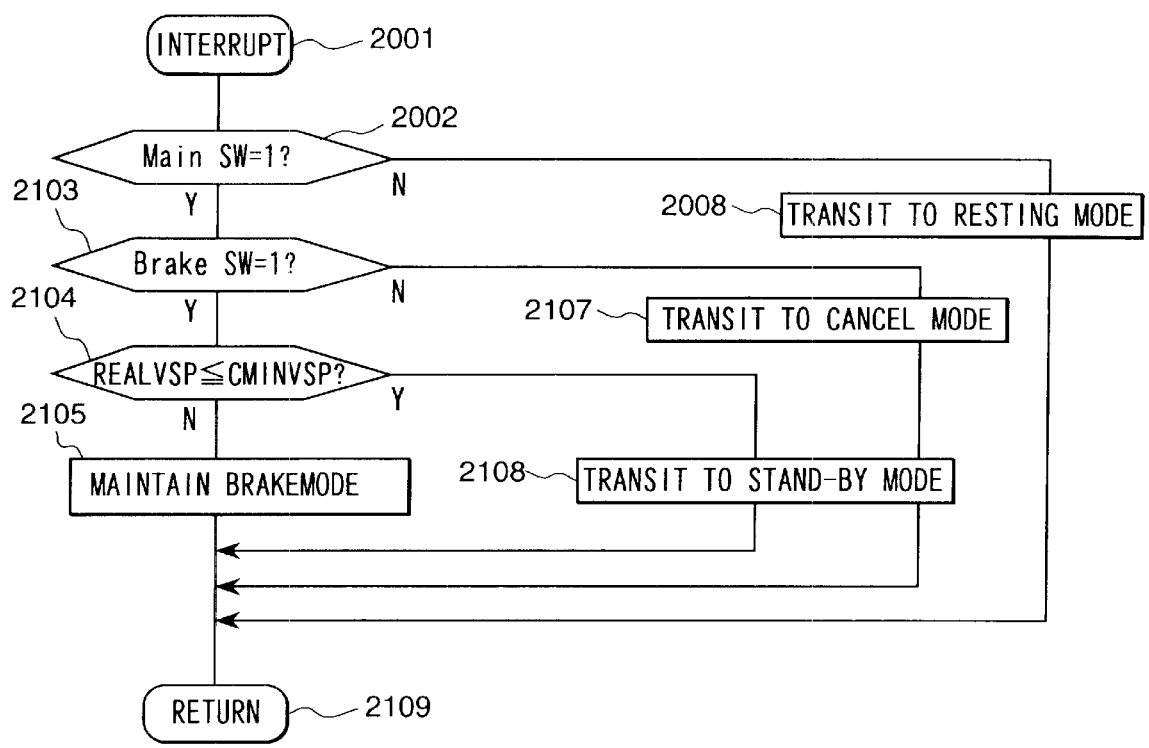
FIG. 21 is a flowchart showing a detail of a part of the flowchart of FIG. 11 for showing a state transition judgment process under a brake mode.

FIG. 21 is a flowchart showing the state transition judgment process in the brake mode.

At judgment step 2102, the state of the MAIN SW is checked. If the MAIN SW is ON, the process jumps to judgment step 2103 and if the MAIN SW is OFF, the process jumps to step 2106 to determine transition to the resting mode. At judgment step 2103, state of the brake SW is checked. If the brake SW is OFF, the process jumps to step 2107 to determine transition to the cancel mode. If the brake SW is ON, the process jumps to step 2104 to check whether current vehicle speed REALVSP≦cruising lower limit vehicle speed CMINVSP is true or false. If true, the process jumps to step 2108 to determine transition to the stand-by mode, and if false, the process jumps to judgment step 2105 to maintain the current brake mode.

Figure 22:
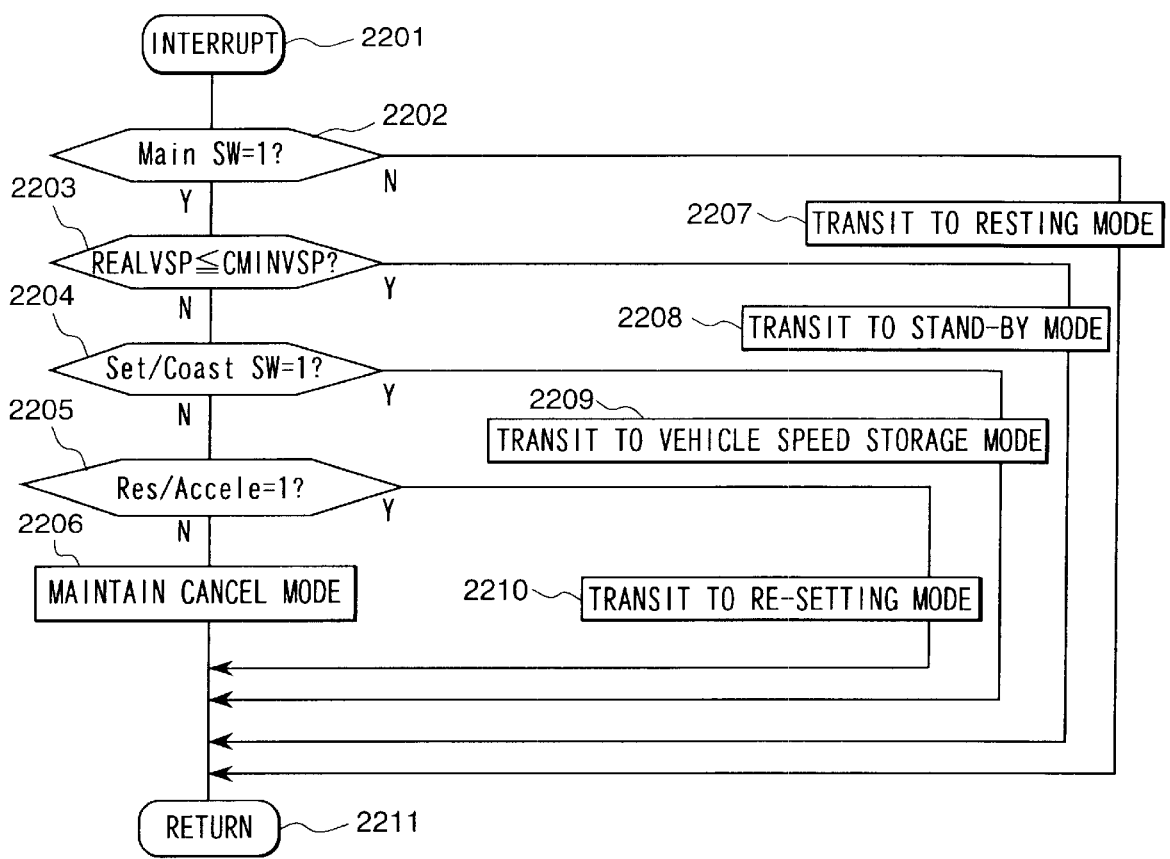
FIG. 22 is a flowchart showing a detail of a part of the flowchart of FIG. 11 for showing a state transition judgment process under a cancel mode.

FIG. 22 is a flowchart showing the state transition judgment process in the cancel mode.

At judgment step 2202, the state of the MAIN SW is checked. If the MAIN SW is ON, the process jumps to judgment step 2203 and if the MAIN SW is OFF, the process jumps to step 2207 to determine transition to the resting mode. At judgment step 2203, check is performed whether current vehicle speed REALVSP≦cruising lower limit vehicle speed CMINVSP is true or false. If true, the process jumps to step 2208 to determine transition to the stand-by mode, and if false, the process jumps to judgment step 2204. At judgment step 2204, state of the SET/COAST SW is checked. If the SET/COAST SW is OFF, the process jumps to judgment step 2205. At judgment step 2205, state of the RES/ASCCEL SW is checked. IF ON, the process jumps to step 2210 to transit to re-setting mode. If OFF, the process jumps to step 2206 to maintain the current cancel mode.

Figure 23:
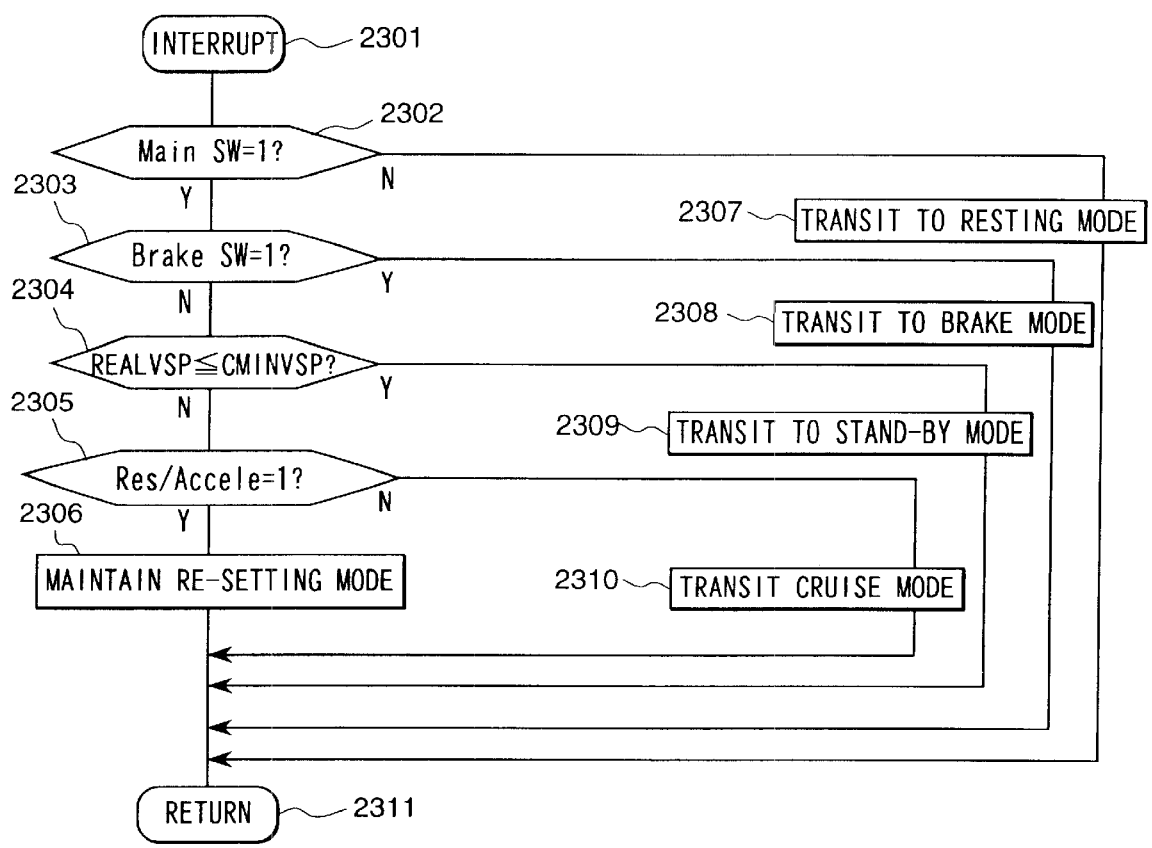
FIG. 23 is a flowchart showing a detail of a part of the flowchart of FIG. 11 for showing a state transition judgment process under re-setting mode.

FIG. 23 is a flowchart showing the state transition judgment process in the re-setting mode.

At judgment step 2302, the state of the MAIN SW is checked. If the MAIN SW is ON, the process jumps to judgment step 2303 and if the MAIN SW is OFF, the process jumps to step 2307 to determine transition to the resting mode. At judgment step 2303, state of the brake SW is checked. If the brake SW is ON, the process jumps to step 2308 to transit to brake mode. If OFF, the process jumps to step 2304.

At judgment step 2304, check is performed whether current vehicle speed REALVSP≦cruising lower limit vehicle speed CMINVSP is true or false. If true, the process jumps to step 2309 to determine transition to the stand-by mode, and if false, the process jumps to judgment step 2305. At judgment step 2305, state of the RES/ACCEL SW is checked. If ON, the process jumps to step 2306 to maintain there-setting mode. If OFF, the process jumps to step 2310 to transit to the cruise mode.

Figure 24:
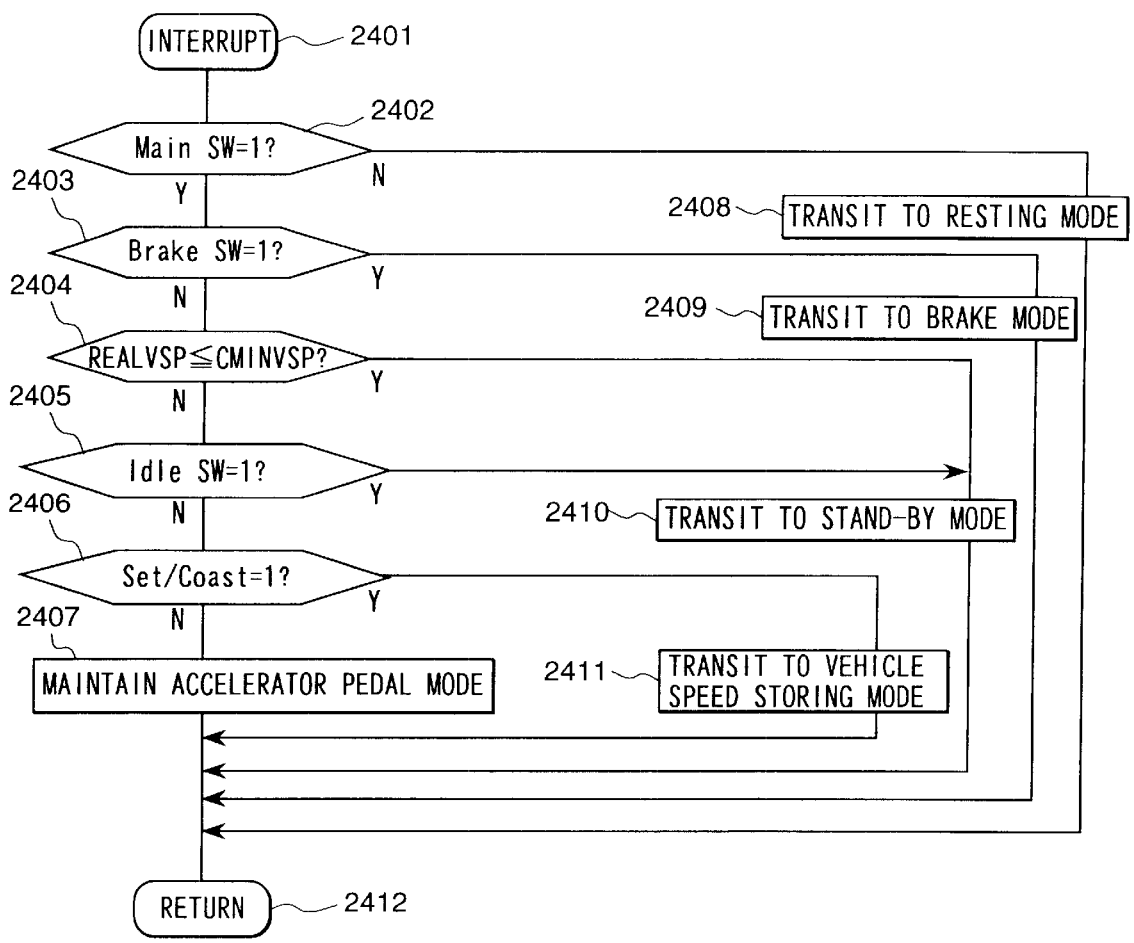
FIG. 24 is a flowchart showing a detail of a part of the flowchart of FIG. 11 for showing a state transition judgment process under an accelerator pedal mode.

FIG. 24 is a flowchart showing the state transition judgment process in the accelerator pedal mode.

At judgment step 2402, the state of the MAIN SW is checked. If the MAIN SW is ON, the process jumps to judgment step 2403 and if the MAIN SW is OFF, the process jumps to step 2408 to determine transition to the resting mode. At judgment step 2403, state of the brake SW is checked. If the brake SW is ON, the process jumps to step 2409 to transit to brake mode. If OFF, the process jumps to step 2404.

At judgment step 2404, check is performed whether current vehicle speed REALVSP≦cruising lower limit vehicle speed CMINVSP is true or false. If false, the process jumps to step 2405. At judgment step 2405, the state of the IDLE SW is judged. If ON, the process jumps to step 2410 to transit to the stand-by mode. If OFF, the process jumps to judgment step 2406. Here, IDLE SW is a switch which is turned ON at substantially fully closed position in the accelerator depression magnitude. The IDLE SW may be replaced with a software process for setting a flag to one when the accelerator depression magnitude sensor signal becomes less than or equal to a predetermined value. At judgment step 2406, the state of the SET/COAST SW is checked. If ON, the process jumps to step 2411 to determine transition to the vehicle speed storing mode. If OFF, the process jumps to step 2407 to maintain the current accelerator pedal mode.

While discussion has been given for the case where the present invention is applied for the automatic cruise control. Difference of operations in stoichiometric mixture combustion and lean mixture combustion of typical parameter in FIGS. 30 and 31.

Figure 6:
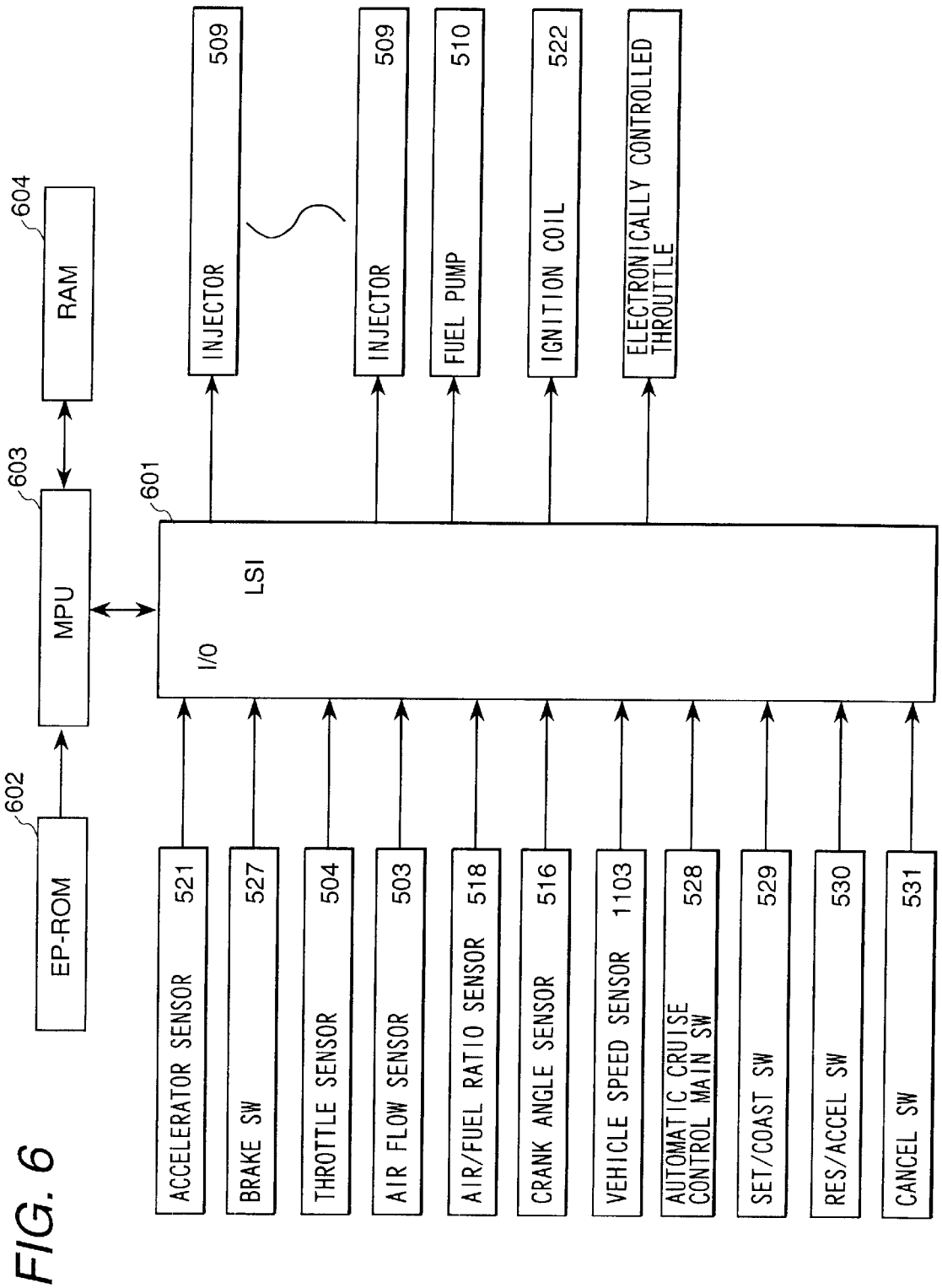
FIG. 6 is a block diagram showing an internal construction of the preferred embodiment of the engine control system of FIG. 5.
Figure 30:
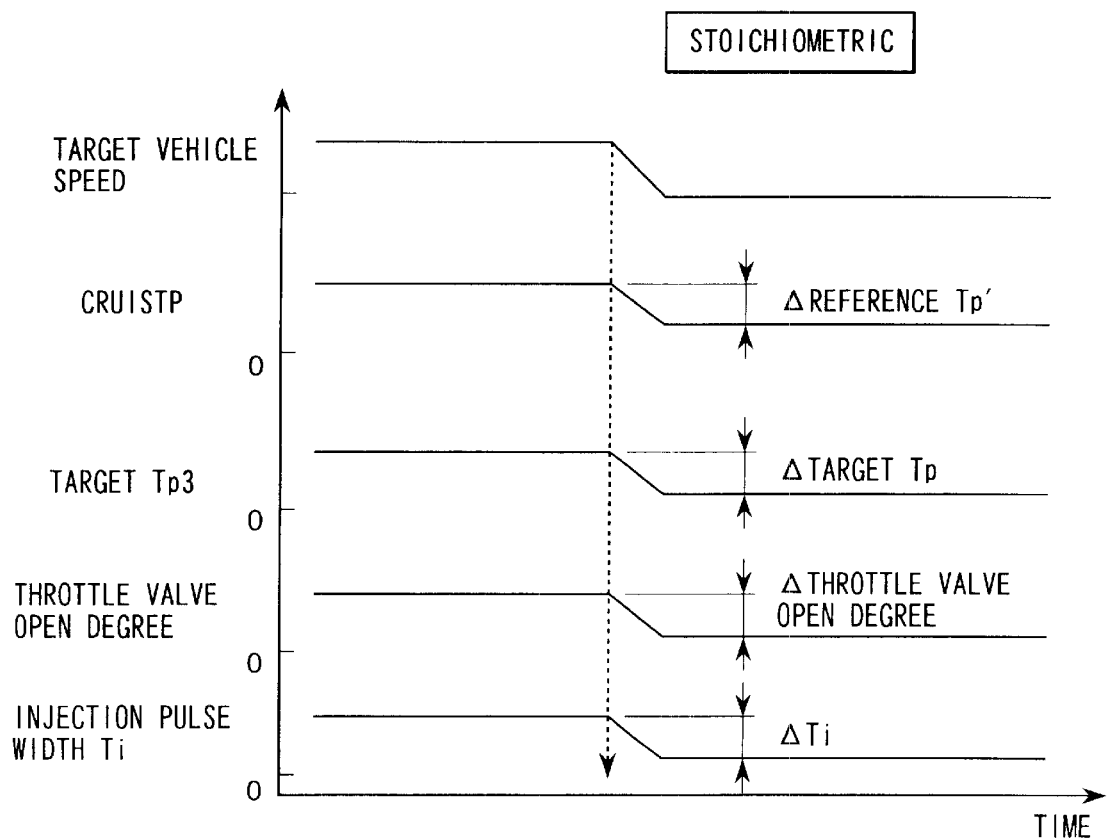
FIG. 30 is a timing chart of control of the engine control system of FIGS. 3 and 4 showing an example in an operational state under stoichiometric mixture ratio.

FIG. 30 is a timing chart upon variation of target vehicle speed at stoichiometric mixture condition. When the target vehicle speed TARGVSP is reduced, the vehicle speed control means 1106 of FIG. 6 namely control of FIG. 10 becomes active to reduce the target engine torque to reduce the cruise demanded component CRUISTP. At the same time, an intake air amount corresponding to the target fuel injection amount Tp3 is reduced in corresponding amount. Namely, Δreference Tp' in FIG. 30 and Δtarget Tp are the same. Due to reduction of the cruise demanded component CRUISTP, the fuel injection pulse width Ti is reduced to decrease fuel amount. At the same time, due to reduction of the target Tp, the air amount corresponding to the basic fuel injection amount Tp1 is reduced with feedback controlling the throttle valve open degree due to reduction of the target Tp to reduce intake air flow rate.

Figure 31:
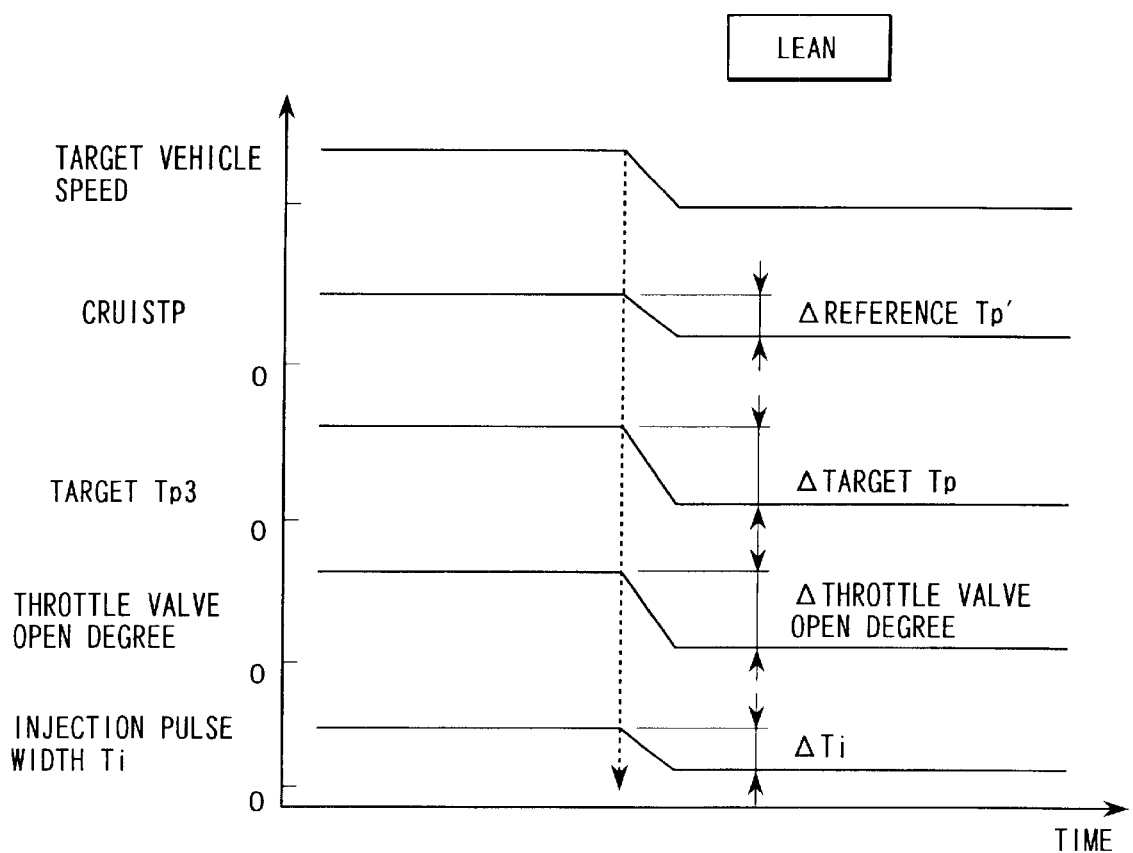
FIG. 31 is a timing chart of control of the engine control system of FIGS. 3 and 4 showing an example in an operational state under lean-burn mixture ratio.

Next, FIG. 31 is a timing chart in the case of lean mixture combustion (homogenous lean mixture combustion or stratified lean mixture combustion) as compared with the case of stoichiometric mixture combustion of FIG. 30.

As shown in FIG. 30, when the target vehicle speed TARGVSP is reduced, the vehicle speed control means 1106 of FIG. 2 namely control of FIG. 10 becomes active to reduce the target engine torque to reduce cruise demanded component CRUISTP. By this, the fuel injection pulse width Ti is reduced to decrease fuel amount similarly to the same of stoichiometric mixture combustion. However, in case of the lean mixture combustion, the air amount corresponding to the target fuel injection amount Tp3 is calculated by multiplying the reference fuel injection amount Tp2 selected CRUISTP by the target air/fuel ratio (e.g. 40) and by dividing the product by the stoichiometric air/fuel ratio 14.7. Therefore, variation amount of the air amount corresponding to the target fuel injection amount Tp3 (target Tp) becomes greater than that in case of stoichiometric mixture combustion. Namely, the variation amount Δ target Tp of the air amount corresponding to the fuel injection amount Tp3 (target Tp) in FIG. 31 becomes larger than the variation amount Δ target Tp of the air amount corresponding to the target fuel injection amount Tp3 (target Tp) in FIG. 30 in the extent of air/fuel ratio. Naturally, the variation amount Δθ of throttle valve open degree in FIG. 31 is greater than that in FIG. 30. In FIGS. 30 and 31, the air amount corresponding to the basic fuel injection amount Tp1 is reduced with feedback controlling the throttle valve open degree in the amount corresponding to the air amount corresponding to respective target fuel injection amount Tp3 for reducing the intake air flow rate corresponding to combustion.

Figure 32:
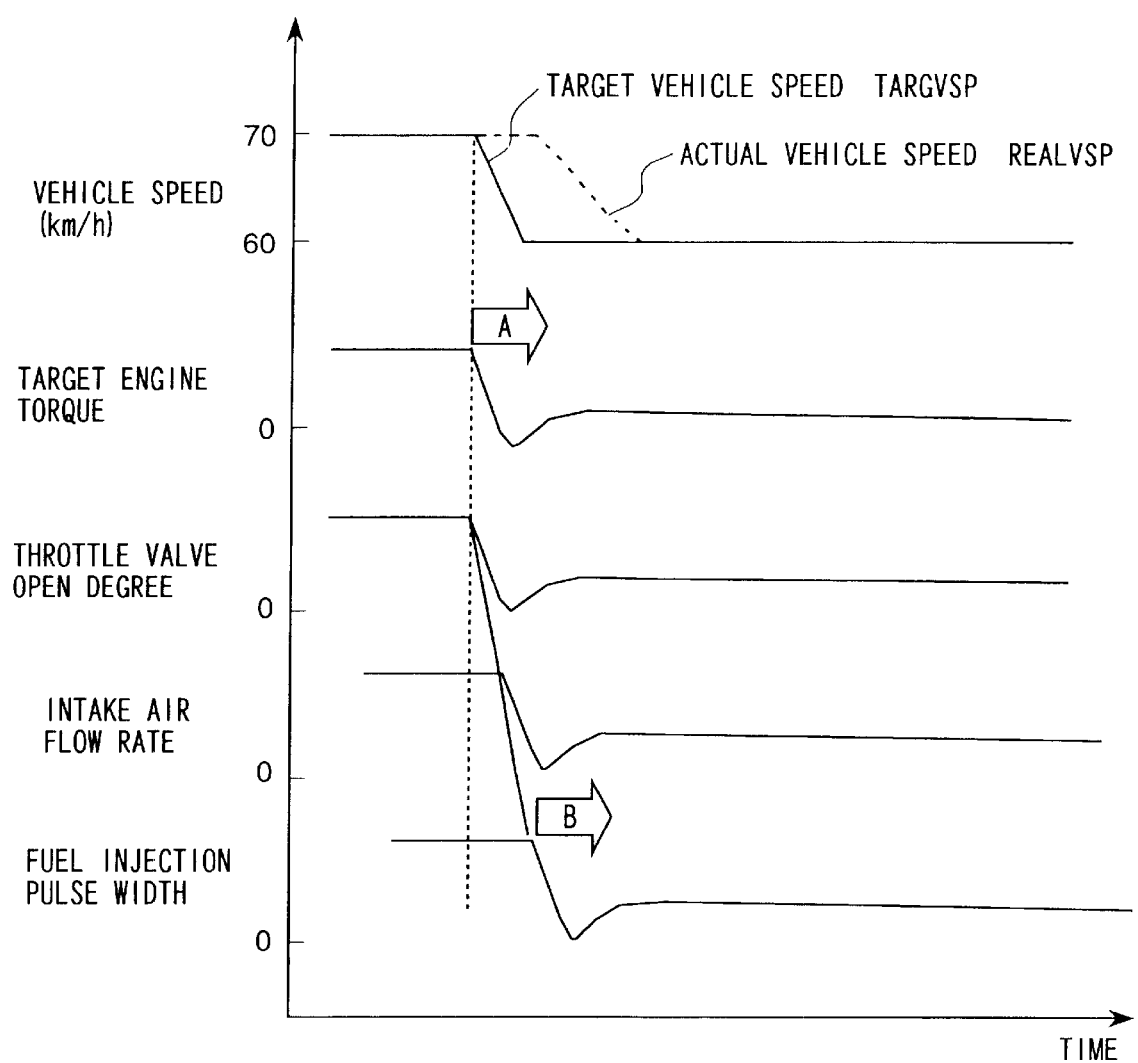
FIG. 32 is a timing chart of the conventional engine control system.

FIG. 32 is an example of the conventional control showing behavior of respective parameters in the case where the target vehicle speed TARGVSP is abruptly reduced. This corresponds to deceleration mode in the automatic cruise control and corresponds to the case where the leading vehicle decelerates in a vehicular distance control. When the target vehicle speed TARGVSP is reduced at a timing A in FIG. 32, the target engine torque is reduced correspondingly. Then, the throttle valve open degree is controlled in closing side as a function of the target engine torque. As a result, intake air flow rate Qa is reduced. When the intake air flow rate Qa is reduced, the fuel injection pulse width Ti is reduced at a timing B. Thus, actual vehicle speed REALVSP is also reduced.

Figure 33:
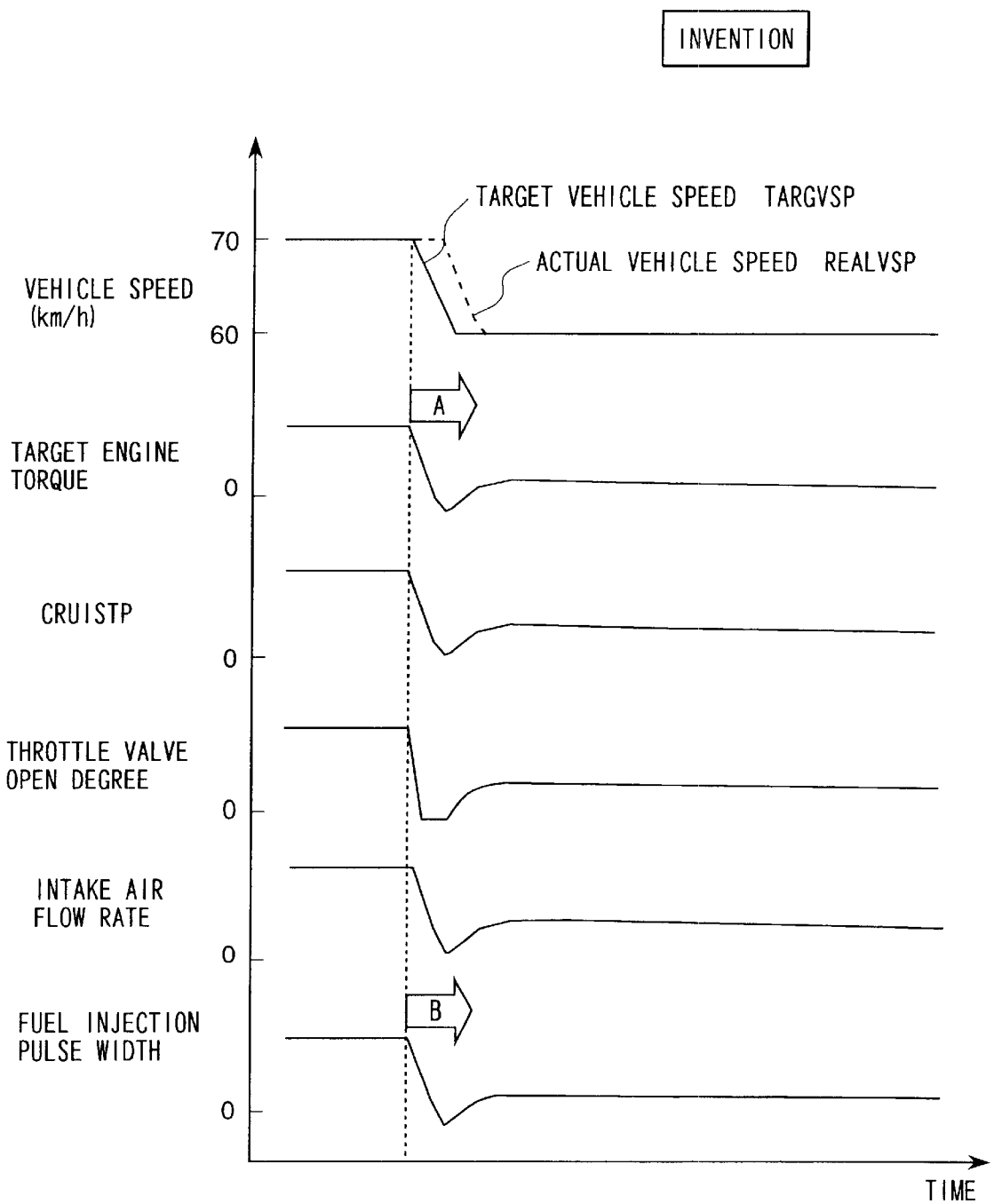
FIG. 33 is a timing chart of control of the engine control system of FIG. 1.

On the other hand, in the control applied the shown embodiment shown in FIG. 33, the target vehicle speed TARGVSP is reduced at the timing A of FIG. 33. The target engine torque is reduced and CRUISTP is reduced. The throttle valve open degree is varied for realizing variation of CRUISTP to cause variation of the fuel injection pulse width Ti at the timing of B.

Comparing the results of FIGS. 32 and 33, reduction of the duel injection pulse width in FIG. 33 (timing B) can be initiated at earlier timing in comparison with FIG. 32 to improve response characteristics of actual vehicle speed.

With the control system for the automotive vehicle according to the present invention, the fuel injection amount is derived on the basis of the target torque derived on upstream side of control, the target air supply amount to the engine is derived on the basis of the fuel injection amount to control the actual air supply amount toward the target supply air amount to adapt vehicle speed control, vehicular distance control, driving wheel speed control, slip ratio control and so forth to various vehicular condition irrespective of combustion condition of the engine to achieve superior precision and response characteristics of control.

Although the present invention has been illustrated and described with respect to exemplary embodiment thereof, it should be understood by those skilled in the art that the foregoing and various other changes, omission and additions may be made therein and thereto, without departing from the spirit and scope of the present invention. For example, although the above-mentioned embodiments have been illustrated and described on the basis of the target engine torque, it should be appreciated that the target load signal may be similarly used instead of the target engine torque. Therefore, the present invention should not be understood as limited to the specific embodiment set out above but to include all possible embodiments which can be embodied within a scope encompassed and equivalent thereof with respect to the feature set out in the appended claims.

What is claimed is:

1. A control system for an automotive vehicle comprises:
vehicle condition control means for controlling vehicle conditions toward a target value, and obtaining a fuel injection amount for the engine according to a target load signal based on said target value; and
means for deriving a target air supply amount to said engine on the basis of said fuel injection amount derived by said vehicle condition control means, deriving an actual air supply amount of the engine; and controlling the detected actual air supply amount toward said target air supply amount.

2. A control system for an automotive vehicle comprising:
control means for controlling at least one of vehicle speed, a vehicular distance, driving wheel speed, slip ratio toward a target value;
means for deriving a target torque of an engine on the basis of said target value;
vehicle condition control means having means for deriving a fuel injection amount for the engine on the basis of said target torque of the engine;
means for deriving a target air supply amount to said engine on the basis of said fuel injection amount derived by said vehicle condition control means;
means for deriving an actual air supply amount of the engine; and
means for controlling the detected actual air supply amount toward said target air supply amount.

3. A control system as set forth in claim 2, wherein said vehicle condition control means includes automatic cruise control means for controlling a traveling speed of the automotive vehicle constant, vehicular distance control means for controlling vehicular distance to a leading vehicle, traction control means for controlling driving wheel speed of the vehicle and side slip control means, and said control system further comprises means for transmitting the target torque from said vehicle condition control means to said engine control means.

4. A control system as set forth in claim 3, wherein the first reference fuel injection amount (Tp2) converted from the target engine torque derived by said automatic cruise control means is used during cruising under automatic cruise control and the second reference fuel injection amount (Tp2) derived at least on the basis of an accelerator depression magnitude under inoperative state of automatic cruise control, and
even under automatic cruise control, said second reference fuel injection amount (Tp2) is retrieved on the basis of the accelerator depression magnitude on the basis of correspondence to conversion when a demanded torque of the driver is greater than said target engine torque.

5. A control system as set forth in claim 3, wherein the first reference fuel injection amount (Tp2) converted from the target engine torque derived by said vehicular distance control means is used while vehicular distance control is active and the second reference fuel injection amount (Tp2) derived at least on the basis of an accelerator depression magnitude under inoperative state of vehicular distance control, and
even under vehicular distance control, said second reference fuel injection amount (Tp2) is retrieved on the basis of the accelerator depression magnitude on the basis of correspondence to conversion when a brake is depressed or a demanded torque of the driver is greater than said target engine torque.

6. A control system as set forth in claim 3, wherein the first reference fuel injection amount (Tp2) converted from the target engine torque derived by said traction control means or side slip control means is used while said traction control means or said side slip control means is active for controlling driving wheel speed or tire slip ratio and the second reference fuel injection amount (Tp2) derived at least on the basis of an accelerator depression magnitude under inoperative state of traction control or side slip control.

7. A control system for an automotive vehicle comprising:

control means for controlling at least one of vehicle speed, a vehicular distance, driving wheel speed, slip ratio toward a target value;

means for deriving a target torque of an engine on the basis of said target value;

vehicle condition control means having means for converting the target torque of said engine to a reference fuel injection amount (Tp2);

means for deriving an air amount corresponding to a target fuel injection amount (Tp3) of the engine derived on the basis of a target air/fuel ratio determined depending upon said reference fuel injection amount (TP2) and operating condition of said vehicle;

means for deriving an air amount corresponding the basic fuel injection amount Tp1 of the engine at the stoichiometric air/fuel ration (A/F=14.7) on the basis of an intake air flow rate of the engine and an engine revolution speed; and means for controlling a throttle valve open degree for controlling the air amount corresponding to said basic fuel injection amount (Tp1) toward the air amount corresponding to said target fuel injection amount (Tp3).

8. A control system as set forth in claim 7, wherein converting means for converting said target torque into the reference fuel injection amount (Tp2) of the engine performs conversion with one of a function, a table and a map indicative of the target torque and the reference fuel injection amount (Tp2).

9. A control system as set forth in claim 7, which further comprises means for deriving the reference fuel injection amount (Tp2) on the basis of a torque corresponding to an acceleration depression magnitude in addition to said means for deriving the reference duel injection amount (Tp2) derived by conversion from said target torque, and reference fuel injection amount selecting means for selecting one of said reference fuel injection amount (Tp2) depending upon operational demand of a driver.

10. A control system as set forth in claim 9, wherein said means for deriving the reference fuel injection amount (Tp2 on the basis of the torque corresponding to said accelerator depression magnitude includes means for converting the reference fuel injection amount (Tp2) based on the accelerator depression magnitude into the torque using an inverse function of converting means for converting from the target torque into the reference fuel injection amount (Tp2) and a reverse retrieval of the table or map.

11. A control system as set forth in claim 7, wherein control is performed using at least one of control parameters among air/fuel ratio, spark ignition timing, fuel injection start timing, fuel injection termination timing, EGR ratio, control parameter of swirl flow in an engine cylinder in addition to control of said throttle valve open degree upon controlling the air amount corresponding to said basic fuel injection amount (Tp1) to the air amount corresponding to said target fuel injection amount (Tp3).

12. A control system as set forth in claim 11, wherein said control parameters includes three kinds for stoichiometric mixture combustion, homogenous lean combustion and stratified lean combustion depending upon operating condition of the engine.

13. A control method for an automotive vehicle comprising the steps of:

controlling a vehicular condition of at least one of vehicular speed, vehicular distance, driving wheel speed and slip ratio toward a target value;

replacing said target value into a target torque of an engine;

deriving a fuel injection amount of the engine on the basis of the target torque of the engine;

deriving a target air supply amount on the basis of said fuel injection amount;

deriving an actual air supply amount of said engine on the basis of detected vehicular condition; and controlling the actual air supply amount thus derived toward said target air supply amount.

14. A control method for an automotive vehicle comprising the steps of:

controlling at least one of vehicle speed, a vehicular distance, driving wheel speed, slip ratio toward a target value;

deriving a target torque of an engine on the basis of said target value;

converting the target torque of said engine to a reference fuel injection amount (Tp2);

deriving an air amount corresponding to a target fuel injection amount (Tp3) of the engine derived on the basis of a target air/fuel ratio determined depending upon said reference fuel injection amount (TP2) and operating condition of said vehicle;

deriving an air amount corresponding the basic fuel injection amount Tp1 of the engine at the stoichiometric air/fuel ration (A/F=14.7) on the basis of an intake air flow rate of the engine and an engine revolution speed; and controlling a throttle valve open degree for controlling the air amount corresponding to said basic fuel injection amount (Tp1) toward the air amount corresponding to said target fuel injection amount (Tp3).

15. A control method for an automotive vehicle comprising the steps of:

controlling a vehicular condition toward a target value;

replacing said target value into a target load signal of an engine;

deriving a fuel injection amount of the engine on the basis of the target load signal of the engine;

deriving a target air supply amount on the basis of said fuel injection amount;

deriving an actual air supply amount of said engine on the basis of detected vehicular condition; and controlling the actual air supply amount thus derived toward said target air supply amount.

* * * * *